(12) United States Patent
Sharma et al.

(10) Patent No.: US 11,445,040 B2
(45) Date of Patent: Sep. 13, 2022

(54) PLATFORM FOR MIGRATION PLANNING OF NETWORK INFRASTRUCTURES

(71) Applicant: Accenture Global Solutions Limited, Dublin (IE)

(72) Inventors: Swati Sharma, Bangalore (IN); Kishore P. Durg, Bangalore (IN); Paul Sebastian, Bangalore (IN); Sriram Kannan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/411,248

(22) Filed: Aug. 25, 2021

(65) Prior Publication Data

US 2022/0086241 A1 Mar. 17, 2022

(30) Foreign Application Priority Data

Sep. 14, 2020 (IN) .............................. 202011039681

(51) Int. Cl.
*H04L 29/08* (2006.01)
*H04L 67/51* (2022.01)
*H04L 67/10* (2022.01)

(52) U.S. Cl.
CPC .............. *H04L 67/51* (2022.05); *H04L 67/10* (2013.01)

(58) Field of Classification Search
CPC .......... H04L 67/34; H04L 67/10; H04L 67/51; H04L 67/1097; H04L 67/00; H04L 29/08; G06F 9/4856; G06F 9/5072; G06F 9/48; G06F 9/50
See application file for complete search history.

(56) References Cited

U.S. PATENT DOCUMENTS

| | | | |
|---|---|---|---|
| 2016/0019636 A1* | 1/2016 | Adapalli | ................. H04L 47/70 705/26.81 |
| 2018/0329700 A1* | 11/2018 | Doshi | ....................... G06F 8/75 |
| 2019/0197171 A1* | 6/2019 | Tiwari | .................... G06F 3/067 |

* cited by examiner

*Primary Examiner* — George C Neurauter, Jr.
*Assistant Examiner* — Mehulkumar J Shah
(74) *Attorney, Agent, or Firm* — Fish & Richardson P.C.

(57) ABSTRACT

Implementations of the present disclosure include receiving, by the cloud migration platform, user input indicating a type of case for cloud migration planning, the type including one of an abstract case and a detailed case, in response to receiving the type of case, selectively initiating, by the cloud migration platform, a discovery process for generating discovery data representative of infrastructure assets and application assets of the enterprise network, processing the discovery data through a sub-set of engines of a set of engines of the cloud migration platform, the sub-set of engines providing output including cloud platform selection data, application disposition data, target architecture data, bill of materials (BOM) data, and application remediation data, and generating, by a cloud migration planning engine of the cloud migration platform and based on the output, a cloud migration plan including an application sequence plan for migrating applications to one or more cloud platforms.

20 Claims, 19 Drawing Sheets

FIG. 3B

| BUSINESS CASE · ROM VERSION 1.0 | | | | | | | | | |
|---|---|---|---|---|---|---|---|---|---|
| IT SPEND | 1000.0 | 1000.0 | 1000.0 | 1000.0 | 1000.0 | - | - | - | 5000.0 |
| IT Spend AS-IS (Baseline) | 670.0 | 670.0 | 670.0 | 670.0 | 670.0 | - | - | - | 3350.0 |
| Post Migration TO-BE (End Future State Cost) | 762.5 | 397.3 | 332.5 | 332.5 | 332.5 | - | - | - | 2157.3 |
| Post Migration Savings | (92.5) | 272.7 | 337.5 | 337.5 | 337.5 | - | - | - | 1192.7 |
| Post Migration Savings % | (13.8)% | 40.7% | 50.4% | 50.4% | 50.4% | 0.0% | 0.0% | 0.0% | 35.6% |
| Transformation & Optimization Initiatives (Net Benefits) | - | 2.0 | 3.4 | 2.3 | 0.5 | 0.5 | - | - | 8.7 |
| Total Benefits | (92.5) | 274.7 | 340.9 | 339.8 | 338.0 | 0.5 | 0.0 | 0.0 | 1201.5 |

| Instance Name | OS | OS Version | Recommended | EBS Optim | Bottleneck | MS SQL Ed | SQL Versio | On Time (%) |
|---|---|---|---|---|---|---|---|---|
| machine.10.acme.com | Windows | Microsoft Windows Server 2012 R2 Standard | c5.large | false | CPU and memory | | | 100.0 |
| machine.11.acme.com | Windows | Microsoft Windows Server 2008 R2 Standard | c5.large | false | CPU and memory | | | 100.0 |
| machine.12.acme.com | Windows | Microsoft Windows Server 2012 R2 Standard | r5.xlarge | false | CPU and memory | | | 100.0 |
| machine.13.acme.com | Windows | Microsoft Windows Server 2012 R2 Standard | m5.large | false | Memory | SQL Server 11.0.2100 | | 100.0 |
| machine.14.acme.com | Windows | Microsoft Windows Server 2008 R2 Standard | c5.xlarge | false | Memory | | | 100.0 |
| machine.15.acme.com | Windows (MS SQL | Microsoft Windows Server 2008 R2 Standard | c5.xlarge | false | Disk and Network IO | SQL Server 9.00.5057 | | 100.0 |
| machine.16.acme.com | Windows | Microsoft Windows Server 2008 R2 Standard | c5.large | false | CPU and memory | | | 100.0 |
| machine.17.acme.com | Windows | Microsoft Windows Server 2008 R2 Standard | c5.large | false | CPU and memory | | | 100.0 |
| machine.18.acme.com | Windows | Microsoft Windows Server 2008 R2 Standard | c5.large | false | CPU and memory | SQL Server 10.50.161 | | 100.0 |
| machine.19.acme.com | Windows | Microsoft Windows Server 2008 R2 Standard | c5.large | false | CPU and memory | SQL Server 9.00.5000 | | 100.0 |
| machine.1.acme.com | Windows | Microsoft Windows Server 2008 R2 Standard | m5.large | false | Memory | SQL Server 10.50.404 | | 100.0 |
| machine.20.acme.com | Windows | Microsoft Windows Server 2008 R2 Web Edition | c5.large | false | Memory | | | 100.0 |
| machine.21.acme.com | Windows | Microsoft Windows Server 2008 R2 Standard | m5.large | false | Memory | SQL Server | | 100.0 |
| machine.22.acme.com | Windows | Microsoft Windows Server 2012 R2 Standard | m5.large | false | Memory | SQL Server | | 100.0 |
| machine.23.acme.com | Windows | Microsoft Windows Server 2008 R2 Standard | c5.large | false | CPU and memory | | | 100.0 |
| machine.24.acme.com | Windows | Microsoft Windows Vista Business 5.0 | c5.large | false | CPU and memory | | | 100.0 |
| machine.25.acme.com | Windows | Microsoft Windows Server 2008 R2 Standard | t4.large | false | Disk and Network IO | SQL Server | | 100.0 |
| machine.26.acme.com | Windows | Microsoft Windows Server 2012 R2 Standard | m5.large | false | Memory | | | 100.0 |
| machine.27.acme.com | Windows | Microsoft Windows Server 2008 R2 Standard | c5.large | false | CPU and memory | | | 100.0 |
| machine.28.acme.com | Windows | Microsoft Windows Web Server 2008 6 | c5.large | false | CPU and memory | | | 100.0 |
| machine.29.acme.com | Windows | Microsoft Windows Server 2012 R2 Standard | m5.large | false | Memory | | | 100.0 |
| machine.2.acme.com | Windows | Microsoft Windows Server 2008 Standard | c5.large | false | CPU and memory | | | 100.0 |

| Instance Name | Disk | Mount Po | Current Disk Capacity (GB) | Disk Occupancy (GB) |
|---|---|---|---|---|
| machine.10.acme.com | esx_vol8] fs-stam2/fs-stam2 | C:\ | 29.3 | 14.8 |
| machine.10.acme.com | esx_vol8] fs-stam2/fs-stam2_1 | F:\ | 195.3 | 31.5 |
| machine.10.acme.com | esx_vol8] fs-stam2/fs-stam2_2 | E:\ | 195.3 | 179.4 |
| machine.11.acme.com | esx_vol8] intranet-core1/intranet-core1 | C:\ | 43.9 | 35.2 |
| machine.12.acme.com | esx_vol8] fs-stam3/fs-stam3 | C:\ | 29.3 | 14.4 |
| machine.12.acme.com | esx_vol8] fs-stam3/fs-stam3_1 | E:\ | 268.6 | 274.9 |
| machine.12.acme.com | esx_vol8] fs-stam3/fs-stam3_2 | F:\ | 176.9 | 141.3 |
| machine.13.acme.com | ESX_Vol9] sccm-stam1/sccm-stam1 | Unknown | 63.5 | 63.5 |
| machine.13.acme.com | ESX_Vol9] sccm-stam1/sccm-stam1_1 | D:\ | 195.3 | 110.6 |
| machine.13.acme.com | ESX_Vol9] sccm-stam1/sccm-stam1_2 | E:\ | 39.1 | 24.7 |
| machine.13.acme.com | ESX_Vol9] sccm-stam1/sccm-stam1_3 | Unknown | 39.1 | 39.1 |
| machine.13.acme.com | ESX_Vol9] sccm-stam1/sccm-stam1_4 | Unknown | 39.1 | 39.1 |
| machine.14.acme.com | esx_vol4] npm-stam1/npm-stam1 | C:\ | 39.1 | 35.8 |
| machine.14.acme.com | esx_vol4] npm-stam1/npm-stam1_1 | E:\ | 19.5 | 13.9 |
| machine.15.acme.com | esx_vol4] gptest/gptest | C:\ | 29.3 | 26.5 |
| machine.15.acme.com | esx_vol4] gptest/gptest_1 | E:\ | 29.3 | 27.8 |
| machine.16.acme.com | esx_vol3] citrix-core1/citrix-core1 | C:\ | 53.7 | 51.0 |
| machine.17.acme.com | esx_vol3] st-core1/dvs-core1 | C:\ | 97.7 | 78.0 |
| machine.18.acme.com | esx_vol7] ccure-core1_recovered/ccure-co | C:\ | 58.6 | 51.6 |
| machine.19.acme.com | esx_vol3] angel-core1/angel-core1 | C:\ | 34.2 | 33.4 |
| machine.19.acme.com | esx_vol3] angel-core1/angel-core1_1 | E:\ | 83.0 | 85.0 |

*FIG. 4D*

| Component | Region Primary/Secondary | Description | SID | Environment Type | Additional Info | SAPS | # vCPU | RAM (GB) | Persistent/SSD Storage (GB) | Premium Disks (P6) 32 GB | Premium Disks (P15) 64 GB | Premium Disks (P10) 128 GB |
|---|---|---|---|---|---|---|---|---|---|---|---|---|
| Domain Controller | Primary Region | Domain Controller | | Production | | 4355 | 4 | 16 | 128 | | 2 | |
| Domain Controller | Primary Region | Domain Controller DR | | Production | | 4355 | 4 | 16 | 128 | | 2 | |
| Domain Controller | Primary Region | Domain Controller HA | | Production | | 4355 | 4 | 16 | 128 | | 2 | |
| Linux Bastion Host | Primary Region | Linux Bastion Host | | Production | | 4355 | 4 | 16 | 128 | | 2 | |
| Open VPN | Primary Region | Open VPN | | Production | | 4355 | 4 | 16 | 128 | | 2 | |
| Qualys | Primary Region | Qualys | | Production | | 4355 | 4 | 16 | 128 | | 2 | |
| SAP Webdispatcher | Primary Region | SAP Webdispatcher | | Production | | 2178 | 2 | 8 | 128 | | 2 | |
| SAP Webdispatcher | Primary Region | SAP Webdispatcher HA | | Production | | 2178 | 2 | 8 | 128 | | 2 | |
| Windows Bastion Host | Primary Region | Windows Bastion Host | | Production | | 4355 | 4 | 16 | 128 | | 2 | |
| Windows Utility Server | Primary Region | Windows Utility Server | | Production | | 4355 | 4 | 16 | 128 | | 2 | |
| ASR Storage | Primary Region | ASR Storage | | Production | | | | | 221.2 | | | |
| BO ver3 | Primary Region | BO1 ERSAPP | 757 | Production | | 4355 | 4 | 32 | 128 | | 3 | |
| BW ver7 | Primary Region | BW PAS | | Production | | 4355 | 4 | 32 | 128 | | 2 | |
| BW/HANA ver7 | Primary Region | BW/HANA MxxDB DB1 | 272 | Production | | 66600 | 64 | 512 | 422.4 | | 2 | |
| ECC ver1 | Primary Region | ECC ASCS | 123 | Production | | 17420 | 16 | 64 | 128 | | 2 | |
| PO ver1 | Primary Region | PO ASCS+PAS | | Production | | 4355 | 4 | 32 | 192 | | 3 | |
| Portal ver5 | Primary Region | Portal SCS | | Production | | 4355 | 4 | 32 | 128 | | 2 | |
| S4HANA ver6 | Primary Region | S4HANA HANADB DB1 | | Production | | 66600 | 64 | 512 | 422.4 | | 3 | 1 |

PLATFORM FOR MIGRATION PLANNING OF NETWORK INFRASTRUCTURES

CROSS-REFERENCE TO RELATED APPLICATIONS

This application claims the benefit of and priority to Indian Prov. App. No. 202011039681, filed on Sep. 14, 2020, the disclosure of which is expressly incorporated herein by reference in the entirety.

BACKGROUND

Enterprises conduct operations using enterprise networks that include a broad array of assets (e.g., components such as computing assets and computer-implemented assets). Enterprise networks can be provided in on-premise platforms and/or cloud-computing platforms. In an on-premise platform, assets are operated, managed, and controlled by the enterprise. For example, assets can include servers and software programs that are directly owned and managed by the enterprise. In a cloud-computing platform, a third-party service provider operates, manages, and controls assets on behalf of enterprises.

In many instances, enterprises migrate between types of platforms. For example, an enterprise can migrate from an on-premise platform to a cloud-computing platform for numerous benefits (e.g., reduced total cost of ownership (TCO), elasticity, scalability, on-demand availability, high availability, pay-per-use). Cloud-based services enable enterprises to quickly respond to growing or fluctuating resource demands, thereby enhancing agility, reducing capital expenditures, increasing employee and stakeholder collaboration, and improving security and compliance. In some instances, enterprises migrate from one cloud-based platform to another cloud-based platform. For example, an enterprise can migrate its operations (or at least a portion thereof) from a first cloud-computing platform to a second cloud-computing platform in an effort to attain efficiencies, reduce costs, and/or improve performance, among other reasons.

However, migrating enterprise networks between platforms is not a straight-forward task. For example, migrating an enterprise network from an on-premise platform to a cloud-based platform is typically a manual and effort-intensive process. This also includes expenditure of technical resources (e.g., processors, memory, bandwidth). There are various objectives and concerns that affect the decisions regarding choosing a particular cloud provider (or a particular mix of cloud providers) over others and which available locations of the same to prefer over the others. Thus, as cloud computing technologies become more ubiquitous, enterprises are confronted with a growing number of complexities regarding how to best migrate existing computing resources to the cloud.

SUMMARY

Implementations of the present disclosure are directed to a cloud migration platform for enterprises. More particularly, implementations of the present disclosure are directed to a cloud migration platform that discovers assets (e.g., computing assets, computer-implemented assets) of an enterprise, assesses the assets, provides one or more proposed cloud-based solutions based on the assessment, executes simulations on the one or more cloud-based solutions for optimization based on respective needs of an enterprise, and provides a migration plan for migrating assets of the enterprise in view of the one or more cloud-based solutions.

In some implementations, actions include receiving, by the cloud migration platform, user input indicating a type of case for cloud migration planning, the type of case including one of an abstract case and a detailed case, in response to receiving the type of case, selectively initiating, by the cloud migration platform, a discovery process for generating discovery data representative of infrastructure assets and application assets of the enterprise network, processing the discovery data through a sub-set of engines of a set of engines of the cloud migration platform, the sub-set of engines providing output including cloud platform selection data, application disposition data, target architecture data, bill of materials (BOM) data, and application remediation data, and generating, by a cloud migration planning engine of the cloud migration platform and based on the output, a cloud migration plan including an application sequence plan for migrating applications to one or more cloud platforms. Other implementations of this aspect include corresponding systems, apparatus, and computer programs, configured to perform the actions of the methods, encoded on computer storage devices.

These and other implementations can each optionally include one or more of the following features: operations further include migrating at least a portion of the enterprise network from an existing infrastructure to a cloud platform by executing at least a portion of the application sequence plan of the cloud migration plan; executing at least a portion of the application sequence plan includes instantiating an instance of a cloud-based application corresponding to an application executed within an enterprise network, and importing data from the enterprise network to the cloud platform for processing by the cloud-based application; generating discovery data representative of infrastructure assets and application assets of the enterprise network includes providing one or more infrastructure agents and one or more application workload agents within the enterprise network to collect infrastructure data and application workload data from existing assets within the enterprise network, each of the one or more infrastructure agents and one or more application workload agents including computer-executable code executed within the enterprise network; the discovery data includes an interim computing architecture representing an existing infrastructure within the enterprise network, the interim computing architecture being generated by an architect generator of a discovery module based on infrastructure data collected from the enterprise network; processing the discovery data through a sub-set of engines of the cloud migration platform includes simulating network performance and application response times using one or more enterprise agents installed in the enterprise network, wherein simulating includes executing tests to determine network performance characteristics and application performance based on data provided by the one or more enterprise agents from the enterprise network; processing the discovery data through a sub-set of engines of the cloud migration platform includes processing user workload historical data and transaction workload data of the enterprise network to provide the BOM data as specifying cloud computing resources of a cloud platform, processing including correlating infrastructure utilization in conjunction with user load and transaction volumes to the cloud computing resources; the application remediation data represents one or more remediations to enable migration of an application from an on-premise platform of the enterprise network to a cloud platform, the application remediation data being generated at least partially based on code scanning data that is generated by code scanning of the application; and the sub-set of engines is selected from the set of engines based on the type of case.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A and 3B depict example screenshots representing example output provided from a cloud enterprise management (CEM) engine of the cloud migration platform of the present disclosure.

FIGS. 4A-4D depict example screenshots representing example output provided from a discovery engine of the cloud migration platform of the present disclosure.

FIGS. 6A-6C depict example screenshots representing example output provided from a cloud solution architecture and simulation (CSAS) engine of the cloud migration platform of the present disclosure.

FIGS. 7A and 7B depict example screenshots representing example output provided from a cloud migration planning (CMP) engine of the cloud migration platform of the present disclosure.

Like reference symbols in the various drawings indicate like elements.

DETAILED DESCRIPTION

Figure 1:
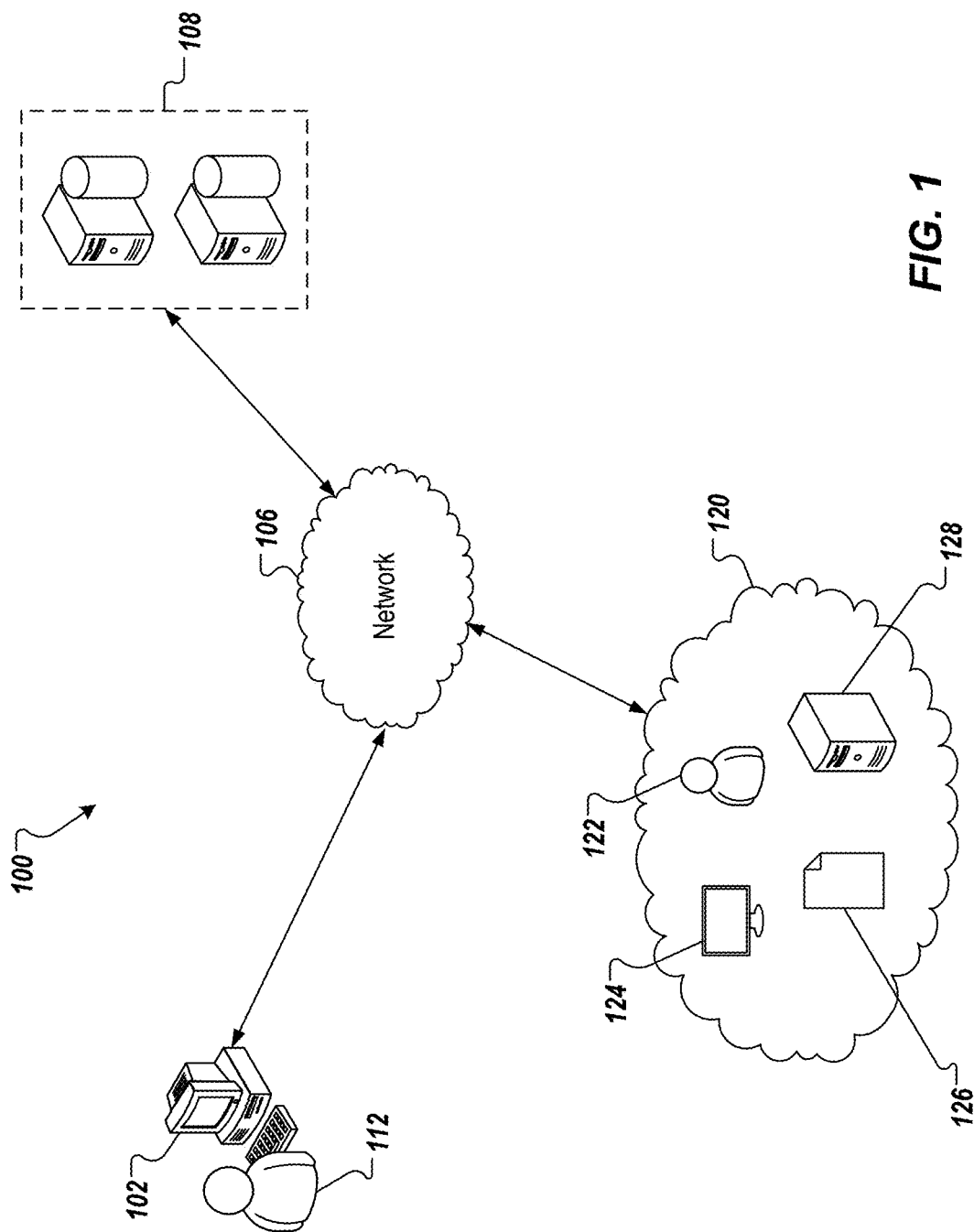
FIG. 1 depicts an example architecture that can be used to execute implementations of the present disclosure.

Implementations of the present disclosure are directed to a cloud migration platform for enterprises. More particularly, implementations of the present disclosure are directed to a cloud migration platform that discovers assets (e.g., computing assets, computer-implemented assets) of an enterprise, assesses the assets, provides one or more proposed cloud-based solutions based on the assessment, executes simulations on the one or more cloud-based solutions for optimization based on respective needs of an enterprise, and provides a migration plan for migrating assets of the enterprise in view of the one or more cloud-based solutions. In some implementations, actions include receiving, by the cloud migration platform, user input indicating a type of case for cloud migration planning, the type of case including one of an abstract case and a detailed case, in response to receiving the type of case, selectively initiating, by the cloud migration platform, a discovery process for generating discovery data representative of infrastructure assets and application assets of the enterprise network, processing the discovery data through a sub-set of engines of a set of engines of the cloud migration platform, the sub-set of engines providing output including cloud platform selection data, application disposition data, target architecture data, bill of materials (BOM) data, and application remediation data, and generating, by a cloud migration planning engine of the cloud migration platform and based on the output, a cloud migration plan including an application sequence plan for migrating applications to one or more cloud platforms.

To provide context for implementations of the present disclosure, and as introduced above, enterprises migrate their enterprise networks between types of platforms. For example, an enterprise can migrate from an on-premise platform to a cloud-computing platform for numerous benefits (e.g., reduced total cost of ownership (TCO), elasticity, scalability, on-demand availability, high availability, pay-per-use). Cloud-based services enable enterprises to quickly respond to growing or fluctuating resource demands, thereby enhancing agility, reducing capital expenditures, increasing employee and stakeholder collaboration, and improving security and compliance. In some instances, enterprises migrate from one cloud-based platform to another cloud-based platform. For example, an enterprise can migrate its operations (or at least a portion thereof) from a first cloud-computing platform to a second cloud-computing platform in an effort to attain efficiencies, reduce costs, and improve performance, among other reasons.

However, migrating enterprise networks between platforms is not a straight-forward task. For example, migrating an enterprise network from an on-premise platform to a cloud-based platform is typically a manual and effort-intensive process. This also includes expenditure of technical resources (e.g., processors, memory, bandwidth). There are various objectives and concerns that affect the decisions regarding choosing a particular cloud provider (or a particular mix of cloud providers) over others and which available locations of the same to prefer over the others. Thus, as cloud computing technologies become more ubiquitous, enterprises are confronted with a growing number of complexities regarding how to best migrate existing computing resources to the cloud.

In view of the above context, and as introduced above, implementations of the present disclosure a cloud migration platform (also referred to herein as the myNav platform). As described in further detail herein, the cloud migration platform of the present disclosure includes a set of engines, each engine performing respective functionality and providing output that can be consumed by one or more other engines in the set of engines. In some implementations, the cloud migration platform discovers assets (e.g., computing assets, computer-implemented assets) of an enterprise, assesses the assets, provides one or more proposed cloud-based solutions based on the assessment, executes simulations on the one or more cloud-based solutions for optimization based on respective needs of an enterprise, and provides a migration plan for migrating assets of the enterprise in view of the one or more cloud-based solutions.

In some implementations, a user (e.g., an agent and/or an employee of an enterprise) can interact with the cloud migration platform to achieve results along differing paths. For example, the user can interact with the platform along a rough order of magnitude (ROM) path or a rapid path to provide an abstract migration plan in a more time-and resource-efficient manner using fewer engines of the cloud migration platform. As another example, the user can interact with the platform along a detailed path or a bespoke path to provide a detailed migration plan using more engines of the cloud migration platform.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host a cloud migration platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware assets (e.g., computing assets, such as computing devices, servers, computers, mobile devices) and software assets (e.g., computer-implemented assets) used to store, retrieve, transmit, and/or manipulate data within the enterprise network 120. In general, OT systems include hardware and software used to monitor and detect or cause changes in processes within the enterprise network 120.

In accordance with implementations of the present disclosure, the server system 108 can host the cloud migration platform (the myNav platform), which can be used for migration planning of at least a portion of the enterprise network 120. For example, and as described in further detail herein, the cloud migration platform executing on the server system 108 can discovers assets (e.g., computing assets, computer-implemented assets) of the enterprise network, assess the assets, provide one or more proposed cloud-based solutions based on the assets and assessment, execute simulations on the one or more cloud-based solutions for optimization based on respective needs of the enterprise, and provide a migration plan for migrating assets of the enterprise in view of the one or more cloud-based solutions. In some examples, the user 112 can access the cloud migration platform using the computing device 102 and can instigate the cloud migration platform to evaluate and provide output regarding the enterprise network 120. In some examples, and as described in further detail herein, the cloud migration platform provides output to the user 112 through the computing device 102 (e.g., displaying one or more user interfaces (UIs) on the computing device 102).

As described in further detail herein, the cloud migration platform of the present disclosure provides, among other functionality, asset discovery and migration planning, cloud readiness and architecture assessment, and cloud remediation analysis. In some examples, and as described in further detail herein, asset discovery includes, but is not limited to, identifying assets (e.g., computing assets, computer-implemented assets) within an enterprise network and providing discovery data representative of the assets. In some examples, and as described in further detail herein, cloud readiness and architecture assessment includes an evaluation on how readily each application executing in the enterprise network is able to migrate to the cloud, as well as respective cloud architectures for the applications. In some examples, and as described in further detail herein, cloud remediation analysis provides recommendations on remediations that can be implemented to ease migration of applications to the cloud.

In general, the cloud migration platform of the present disclosure executes discovery of existing infrastructure (assets) within an enterprise network (e.g., on-premise computing resources), identification of assets to be migrated to the cloud, clustering and sequencing of migration, cloud infrastructure sizing and capacity planning, generation of a migration plan, and execution of the migration plan. One aspect of cloud migration is determining how the system-to-be-migrated will leverage available scalability, burst rate, and cost efficiency features. In a lift-and-shift approach, absent the disclosed systems and techniques of the present disclosure, an organization would typically replicate a sub-optimal infrastructure architecture in the cloud, which defeats the purpose of migrating. Migration should ensure that the cloud infrastructure is designed to support current and future enterprise volumes in terms of both transaction throughput and user base, minimize cloud infrastructure hardware resource cost, minimize system latency and response times, and fulfill peak transient demand.

In further detail, a user (e.g., an employee and/or agent of an enterprise) accesses the cloud migration platform. For example, and with reference to FIG. 1, the user 112 can access the cloud migration platform (hosted in the server system 108) using the computing device 102. In some examples, a starting point for developing a migration plan includes the user using the cloud migration platform defining a ROM migration case and/or a rapid migration case, which will be processed by a cloud migration engine. Input to the ROM migration case and/or a rapid migration case can include an inventory of assets of the enterprise network provided by the user. In such a case, an abstract migration plan is provided using a first sub-set of engines of the cloud migration platform. In some examples, a starting point for developing a migration plan includes the user using the cloud migration platform defining a detailed migration case and/or a bespoke migration case, which will be processed by the cloud migration engine. Input to the detailed migration case and/or the bespoke migration case can include a detailed, granular inventory of assets (deep discovery data) of the enterprise network provided by a discovery engine. In such a case, a detailed migration plan is provided using a second sub-set of engines of the cloud migration platform. In some examples, the first sub-set of engines includes fewer engines than the second sub-set of engines.

In some examples, a migration case takes the actual enterprise landscape (enterprise network) volumetric and industry cost benchmarks to determine a high-level cloud migration plan. This is achieved in a time- and resource-efficient manner (e.g., in days instead of weeks typical of traditional approaches). Output of the cloud migration platform enables the enterprise to explore its portfolio further and determine the cloud readiness, dispositions, the right cloud solution and the provider.

In some implementations, the user leverages a cloud readiness and architecture engine to discover the enterprise network (i.e., landscape including application and computing infrastructure). In some examples, discovery is iterative. For example, in a first iteration, the user discovers high-level application and infrastructure data to understand the application portfolio, determine the target cloud disposition and architectural options and potential cloud provider options.

In some implementations, a so-called green cloud advisor is used to determine a carbon footprint reduction and sustainability index of each potential cloud migration solution. In some implementations, a so-called sovereignty advisor is used to determine which applications require a sovereign cloud basis for data storage. This enables the user to select the right target solution, provider and location to meet defined objectives.

In some implementations, after the readiness and disposition are determined, a deep discovery engine executes infrastructure discovery and detailed application code scanning. In some examples, the user selects one or many engines, described in further detail herein, based on the enterprise network that is being evaluated. In some examples, the cloud migration platform includes a set of discovery engines to, for example and without limitation, scan landscape infrastructure (e.g., computing devices) and applications, scan code of distributed applications, scan code of mainframes, and scan data warehouses.

In some implementations, the cloud migration platform includes a solution architecture engine that consumes infrastructure data provided from the deep discovery along with some additional data to determine a target application architecture within a cloud platform. In some examples, the cloud migration platform also identifies and provides any necessary remediation to migrate applications to the cloud platform. The user can use the visualization engine to download sophisticated cloud architecture diagrams for consumption. The user can also leverage a simulation engine of the cloud migration platform to simulate individual application architectures for performance and architectural type and finalize a best-fit cloud migration solution. For applications that require quick response time and are latency sensitive, the user can leverage a network planning engine of the cloud migration platform to determine a baseline performance and simulate a target performance in the cloud to further decide on the right availability zones and/or remediations to be performed. The input can also help the user in determining the right migration plan for each application.

In some implementations, a migration planning engine of the cloud migration platform ingests the discovery data and the assessment outcomes and process this information to determine a high-level application migration plan. In some implementations, current landscape inputs (representing the enterprise network as existing before migration), target solution outcomes, and the high-level migration plan into a detailed migration case engine along with actual financials (i.e., specific to the enterprise) to evolve the detailed financial business case that can be tracked through the course of transformation. The detailed migration case can be evolved and refined iteratively through the course of the assessment and architectural phases.

Figure 2:
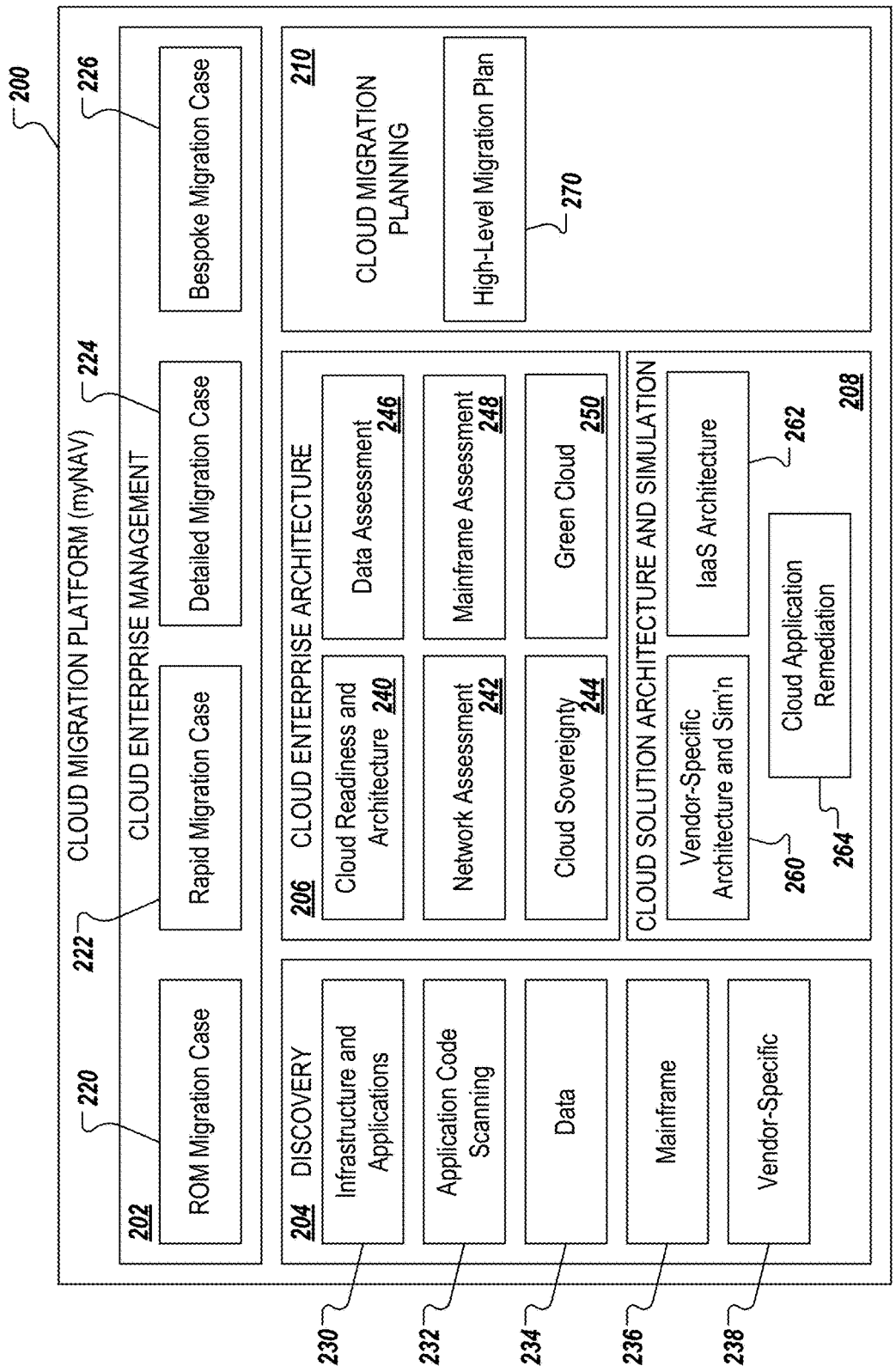
FIG. 2 depicts an example conceptual architecture of a cloud migration platform of the present disclosure.

FIG. 2 depicts an example conceptual architecture of a cloud migration platform 200 in accordance with implementations of the present disclosure. In the example of FIG. 2, the cloud migration platform 200 includes a cloud enterprise management (CEM) module 202, a discovery module 204, a cloud enterprise architecture (CEA) module 206, a cloud solution architecture and simulation (CSAS) module 208, and a cloud migration planning (CMP) module 210. As described in further detail herein, the cloud migration platform 200 ingests data representative of an enterprise network, processes the data, as well as enterprise-specific data (e.g., financials), and provides one or more migration plans as output. A migration plan describes migration of assets (e.g., computer-implemented assets, such as applications, databases, and the like) of the enterprise network to one or more cloud-based platforms. In some examples, the migration plan indicates additional assets (i.e., assets not already included in the enterprise network) that can be deployed. In some examples, the migration plan is absent original assets (i.e., assets included in the enterprise network), which indicates removal.

As used herein, the terms module and sub-module can each also refer to an engine. In some examples, an engine can include, but is not limited to, computer-executable code that is executed to perform functionality described herein. In some examples, each engine receives input, processes the input, and provides output. In some examples, an engine can include or otherwise interact with one or more third-party tools (examples of which are described herein) for execution of described functionality.

In further detail, the CEM module 202 includes example sub-modules, including a ROM migration case sub-module 220, a rapid migration case sub-module 222, a detailed migration case sub-module 224, and a bespoke migration case sub-module 226. In some examples, a user interacts with one or more of the ROM migration case sub-module 220, the rapid migration case sub-module 222, the detailed migration case sub-module 224, and the bespoke migration case sub-module 226.

For example, and as introduced above, the user can interact with the ROM migration case sub-module 220 and/or the rapid migration case sub-module 222 to provide an abstract migration plan based on a user-provided inventory of assets and other information. Example user-provided information can include volumetric data and information technology (IT) spend. Example volumetric data can include, without limitation, number of applications, number of servers, distribution of servers (e.g., physical vs. virtual distribution), operating system (OS) distribution (e.g., Windows, Unix, Linux), environment distribution (e.g., production, staging, test, development), application distribution (e.g., database, middleware, others), and server profiles (e.g., CPU, RAM, utilisation for each server). Example IT spend can include, without limitation, cost, depreciation, operational expenditure (OpEx), revenue, and estimated cloud consumption. In some examples, the user-provided information is processed through a case computational engine based on cost benchmarks (e.g., by industry, size, region) and hyperscaler resources, regions, and costs to provide the output data. The output data is depicted in one or more executive dashboards and business case reports.

Figure 3A:
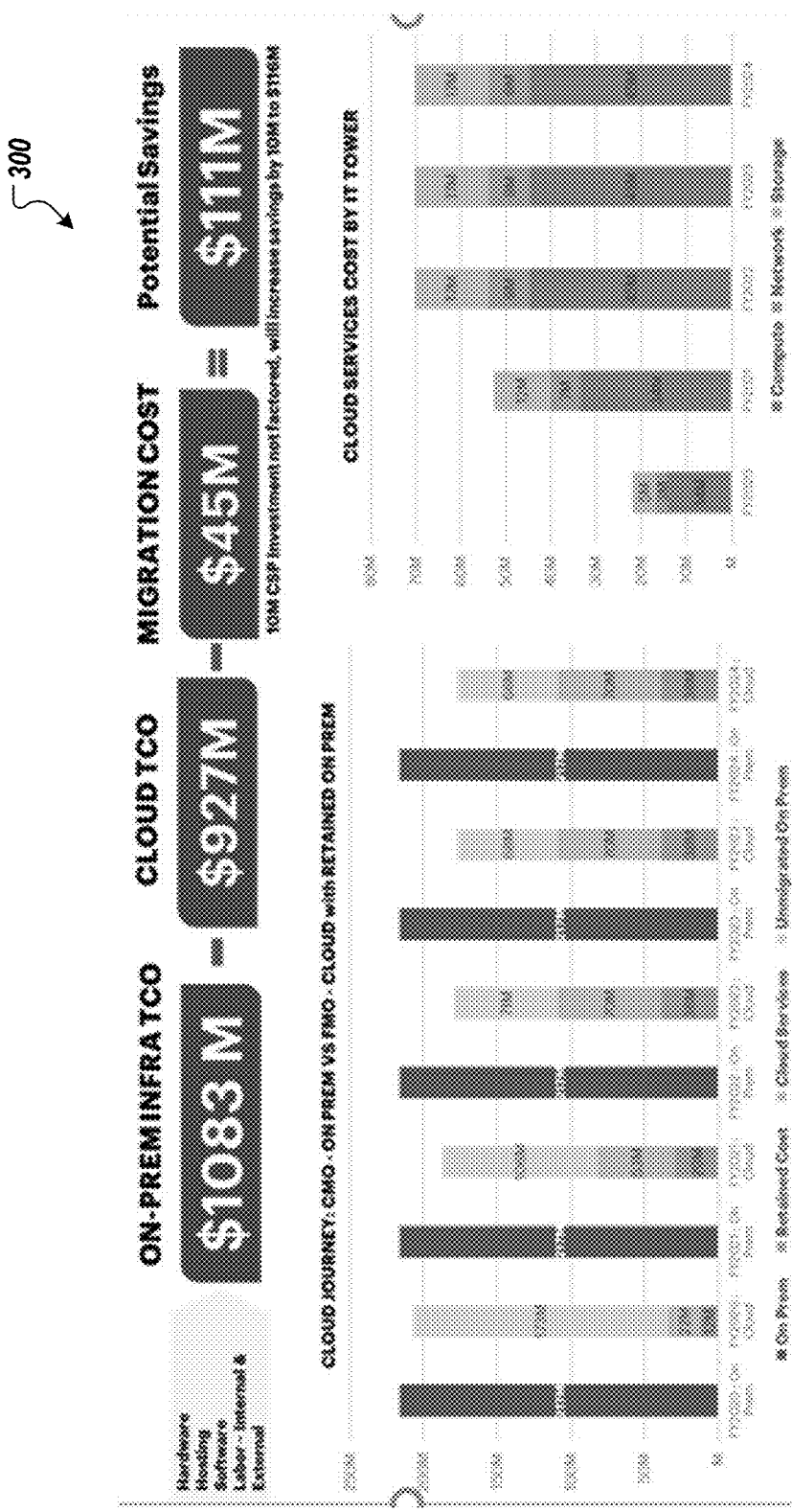

FIGS. 3A and 3B depict example screenshots 300, 302, respectively, representing example output provided from the CEM module 202 of the cloud migration platform of the present disclosure. More particularly, the example screenshots 300, 302 represent example output based on a ROM migration case that is developed by the migration platform using a user-provided inventory of assets. In the examples of FIGS. 3A and 3B, the example output is representative of an abstract migration plan that provides high-level cost information and a more granular case summary. For example, the example screenshot 300 of FIG. 3A depicts potential savings of migration from on-premise to at least partial cloud migration with some assets remaining on-premise. The cost savings is calculated in terms of on-premise TCO, cloud TCO, and migration cost. The depictions of FIGS. 3A and 3B can be described as an abstract migration plan in terms of evaluating the business case for migrating to a cloud platform. This can be performed before doing a more detailed analysis based on discovery data, as described herein.

As another example, and as also introduced above, the user can interact with the detailed migration case sub-module 224 and/or the bespoke migration case sub-module 226 to provide a detailed migration plan based on a platform-provided inventory of assets (i.e., a detailed, granular inventory of assets provided from one or more discovery engines).

In some examples, and as described in further detail herein, the discovery module 204 provides a set of discovery reports that can be visualized (i.e., graphically depicted) to a user and navigated by the user. Further, the set of discovery reports are ingested by the CEA module 206, the CSAS module 208, and/or the CMP module 210 to perform respective functionality as described herein. The discovery module 204 includes an infrastructure and applications (I&A) sub-module 230, an application code scanning sub-module 232, a data discovery sub-module 234, a mainframe sub-module 236, and a vendor-specific sub-module 238. In some examples, the discovery module 204 executes functionality to discover an inventory of applications, server instances, services, connections between applications and third parties, and the like. This information can be referred to as infrastructure data. The discovery module 204 stores the infrastructure data the enterprise network, which includes data representative of a confirmed inventory (e.g., applications, infrastructure, connections) and performance characteristics of assets.

In some examples, the I&A sub-module 230 coordinates discovery using one or more third-party tools (e.g., discovery tools). Example third-party tools include a RISC Networks RN150 virtual appliance provided by Flexera Software LLC, and Cloudamize provided by Cloudamize, Inc. In some examples, the I&A sub-module 230 executes functionality to setup the discovery tool(s), launch discovery, and use the discovery tools to gather application landscape data, and configuration management database (CMDB) data, as well as gather assessment data and planning factors. Example components of the I&A sub-module 230 include a data collection component, a computation and analytics component, and a visualization component.

In some examples, the I&A sub-module 230 processes a set of pre-requisites to setup and launch discovery. Example pre-requisites include, without limitation, a infrastructure data (e.g., VMs) to deploy data collection agents to, IP Subnets to be scanned, infrastructure credentials to enable access (e.g., VMware, Windows Admin, SSH with sudo priviledges, SNMP), ports to be opened for TCP/UDP/ICMP protocols for different infrastructure types and Internet access, and application landscape input (e.g., CMDB details, assessment, dependencies). In some examples, the discovery data includes, without limitation, servers (e.g., Windows, Linux, Unix), virtual machines (VMs), databases (DBs), network equipment, network dependencies, and performance characteristics.

In some examples, the application code scanning module 232 includes components for scanning applications executing within the enterprise network to provide application data. Example components include, without limitation, a code discovery component, a knowledge model (e.g., modeling applications), a computation and analytics component, and a visualization component. In some examples, the data discovery sub-module 234 includes components for scanning data (data objects) stored within the enterprise network to provide data object summaries, examples of which are described in further detail herein. Example components include, without limitation, a script component, a rules engine, and an analytics and visualization component. In some examples, the mainframe sub-module 236 includes components for discovering mainframes within the enterprise network. Example components include, without limitation, a code discovery component, a knowledge model (e.g., modeling mainframes), a computation and analytics component, and a visualization component. In some examples, the vendor-specific sub-module 238 includes components for discovering vendor-specific assets within the enterprise networks. An example vendor includes, without limitation, SAP SE of Walldorf, Germany. Example components include, without limitation, a script component, a rules engine, and an analytics and visualization component.

In some examples, infrastructure data, which is representative of assets and connections within the enterprise network, is collected within the enterprise network using data collection agents. The infrastructure data can be periodically exported, encrypted, and securely transmitted (e.g., using transport layer security (TLS) protocol) to a secure environment). In some examples, an enterprise may want tighter control over the infrastructure data. In view of this, an on-premise deployment can be used, in which the infrastructure data remains within a datacenter of the enterprise. In some examples, infrastructure data is collected using an agentless data collector (ADC) (e.g., using Windows Management Instrumentation (WMI), or the Secure Shell (SSH) protocol for the agentless approach).

In further detail, the discovery module 204 (also referred to as a discovery engine) collects infrastructure data and application workload data from the existing assets within the enterprise network. The infrastructure data includes data specifying the computing resources (e.g., computers, memory, data storage devices, networking equipment) and how the computing resources are connected. The computers can include, for example, web servers, application servers, database servers, client computers, and/or other appropriate types of computing devices. The infrastructure data can also include utilization and performance data for the computing resources. For example, the infrastructure data can include data specifying the utilization of memory (e.g., percent used, numbers of pages in and out or memory, consumed memory, free memory, etc.), processors (e.g., utilization rates, such as processor utilization or system utilization, idle time or percentages, etc.), and data storage (e.g., percentage of space consumed or free, data transfer, throughput, etc.).

The application workload data can include historical user workload data obtained from the existing applications and/or historical transaction workload data obtained from the existing applications. The user workload data can specify, for each application, user tasks performed by the application and, for each user task, a time stamp that indicates when the task was performed. The transaction workload data can specify, for each application, business transaction tasks performed by the application and, for each task, a timestamp that indicates when the task was performed. The user tasks can include tasks initiated by a user (e.g., receiving a user input, saving a file, responding to requests, outputting data requested by the user). The transaction tasks can include tasks performed without direct user input (e.g., schedule recurring tasks, report generation).

The discovery module 204 includes discovery tools (e.g., such as the third-party tools introduced above) and an architecture generator, which can each be implemented on one or more computers. The discovery tools collect the infrastructure data and the application workload data from the enterprise network. In some implementations, in an agent-based approach, infrastructure agents and workload agents are deployed in applications that are running on the enterprise network. The infrastructure agents and workload agents can include software modules installed in the applications and/or on the computers of the enterprise network.

The infrastructure agents collect the infrastructure data and provide the infrastructure data to the discovery tools. The infrastructure agents can be configured to identify the computing resources of the enterprise network. For example, the infrastructure agents can include network scanners that are configured to scan a network for all of the computing devices connected to the network. If the enterprise network includes multiple networks that are not connected, an infrastructure agent can be deployed to each network. The infrastructure agents can collect, for each identified computing resource, characteristics of the resource (e.g., type of resource, model information), performance specifications (e.g., processor speed, data capacity, memory capacity, bandwidth, etc.), and/or other appropriate characteristics. The infrastructure agents can also collect information specifying how the computing resources are connected to each other on the network(s) of the existing infrastructure.

The infrastructure agents can also monitor for and collect, as infrastructure data, the utilization and performance data for the computing resources. The infrastructure data can include data specifying the utilization and/or performance of memory (e.g., percentage of memory used, numbers of pages that are transferred in and out of memory, the amount consumed memory at particular time, the amount of free memory). The infrastructure data can include data specifying the utilization and/or performance of processors (e.g., processor utilization rates, system utilization rates, idle time, percentage of time the processor is idle, the number of CPU cycles per minute, the number of tasks performed per minute). The infrastructure data can include data specifying the utilization and/or performance of data storage devices (e.g., the percentage of storage space consumed or free, the amount of data transferred to and/or from storage, data throughput to and/or from data storage).

The infrastructure agents can monitor the appropriate utilization and performance data for the identified computing resources and provide the infrastructure data for each computing resource to the discovery tools. For example, the infrastructure agents can query system resources of computers to collect this information. The infrastructure agents can connect to monitoring tools (e.g., installed on each computing resource) through application programming interface (API) calls to collect the infrastructure utilization data. In response to the API calls, the monitoring tools can provide, to the infrastructure agents, the queried utilization and/or performance data.

The architecture generator can generate an interim computing architecture for the existing infrastructure based on the infrastructure data collected by the infrastructure agents. The interim computing architecture can specify the computing resources identified by the infrastructure agents, their respective characteristics, and how the computing resources are connected on the network(s). For example, the interim infrastructure can include a bill of materials (BOM) that provides information about each computing resource and/or a network architecture that illustrates or otherwise specifies how the computing resources are arranged on the network(s). The architecture generator can store the interim computing architecture in the data storage unit.

In some implementations, the interim computing architecture is provided as an architecture graph and a BOM. In some examples, the architecture graph is provided as a computer-processable graph (e.g., using graph processing) that includes a set of nodes and a set of edges. Each node represents a component within the existing infrastructure and each edge represents a relationship between components (nodes). Example components can include, without limitation, IT components and OT components. In general, IT components include hardware (e.g., computing devices, servers, computers, mobile devices) and software used to store, retrieve, transmit, and/or manipulate data within the existing infrastructure. In general, OT components include hardware and software used to monitor and detect or cause changes in processes within the existing infrastructure, as well as store, retrieve, transmit, and/or manipulate data. In some examples, the BOM can be provided as a computer-readable file (e.g., .txt file, .csv file) that provides details of components within the existing infrastructure. For example, and without limitation, the BOM can identify a component (e.g., a machine), software executing on the component (e.g., OS), a version of the software (e.g., OS version), and the like.

In some examples, detailed discovery data provided from the discovery module 204 can include, without limitation, application volumetrics, datacenter information, and application data profiles. Example application volumetrics include, without limitation, application identifiers (IDs), application name, application description, application status, application business and technical owner, packaged or custom, version and vendor name, virtualized or physical, architecture type, programming language, application source code availability, OS name, OS current version, system software name, system software current version, application dependencies (e.g., H/W, network, other application), interfaces count, shared services cmponents, application data confidentiality/sensitivity, application tier/criticality, business group/line of business (LoB), application inclination to adapt any 'digital application attributes, number of servers per each application, environment breakdown per server (e.g., development, testing, staging, production). Example datacenter information can include, without limitation, demographics and energy profile.

Further discussion of discovery in enterprise networks is described in commonly assigned U.S. application Ser. No. 16/880,591, filed on May 21, 2020, and entitled Enhanced Selection of Cloud Architecture Profiles, the disclosure of which is expressly incorporated herein by reference in the entirety for all purposes.

Figure 4A:
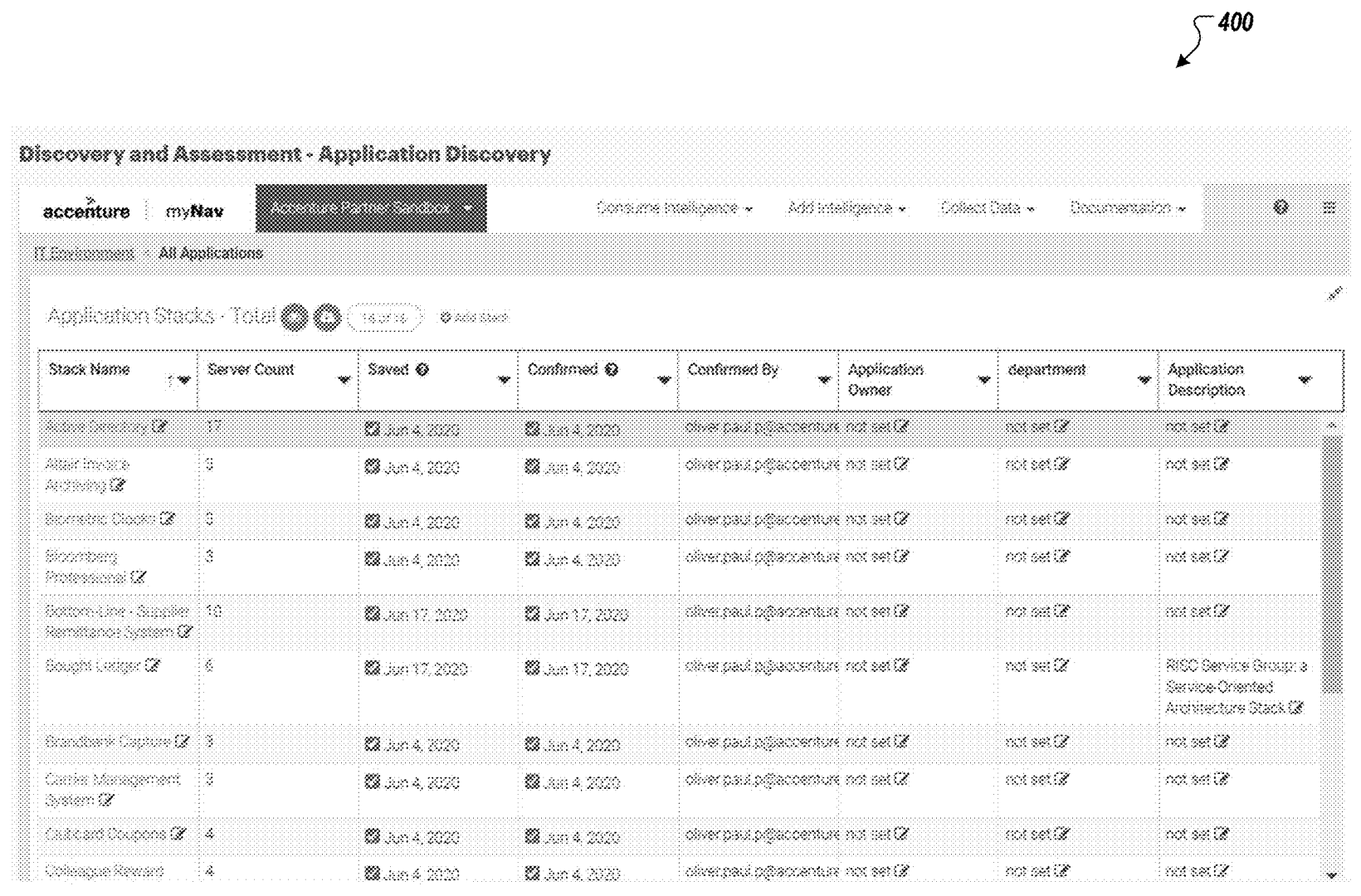
Figure 4B:

FIGS. 4A-4D depict example screenshots 400, 402, 404, 406, respectively, representing example output provided from the discovery module 204 of the cloud migration platform of the present disclosure. In the example of FIG. 4A, detailed information is provided on application stacks discovered within an example enterprise network by the discovery module 204. For example, the stack names of respective application stacks and respective server counts are provided, among other information. In the example of FIG. 4B, information representative of various operating systems (OSs) (e.g., Windows, Linux) is depicted in both graphical and tabular forms.

Figure 4C:
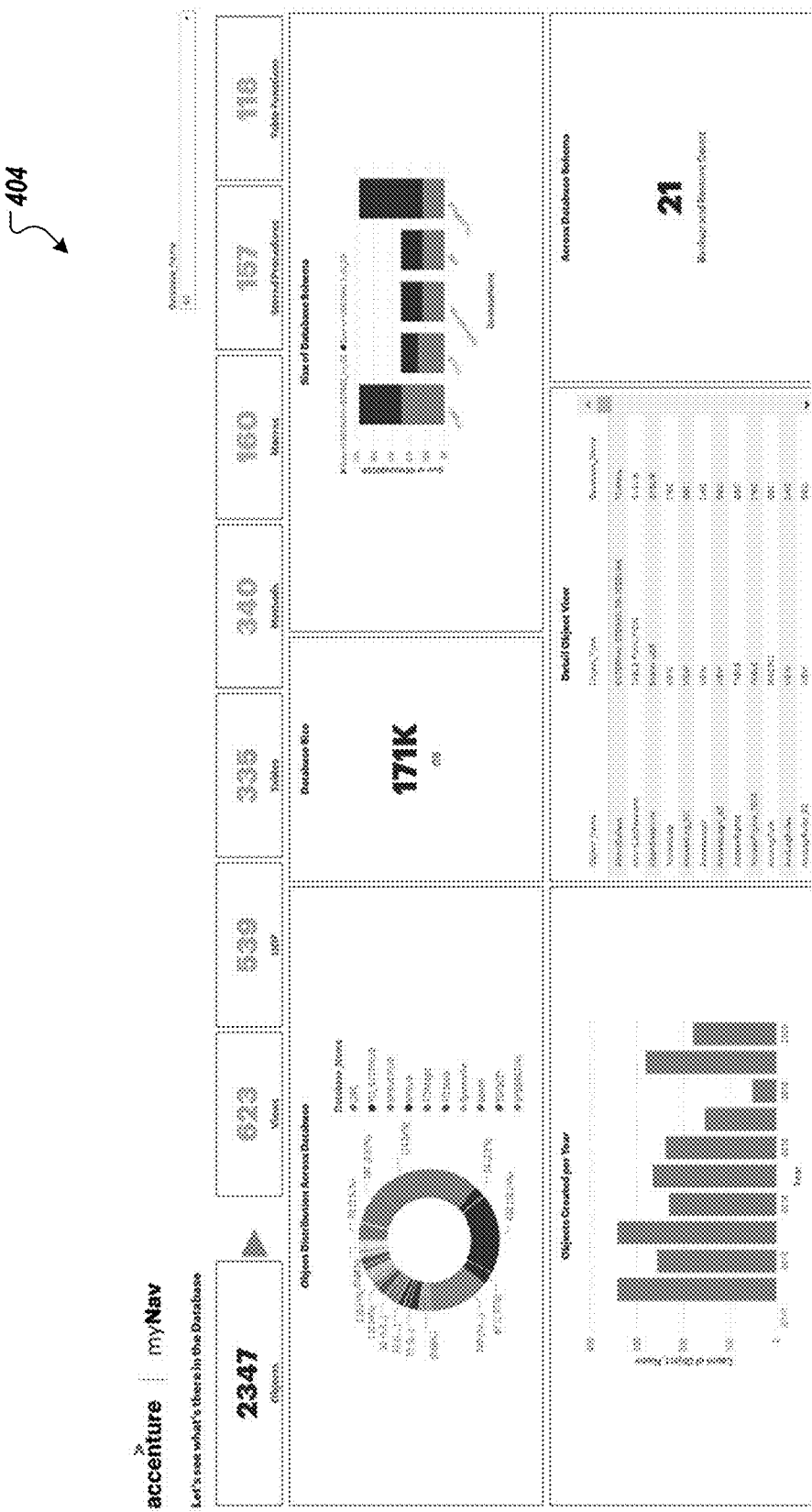

In the example of FIG. 4C, detailed information is provided representing content of one or more databases within the enterprise network. For example, a number of data objects stored in a database as well as types of data objects (e.g., views, uniform data fingerprints (UDFs), tables, methods, macros, stored procedures, table functions). Also in the example of FIG. 4C, statistics for the database are provided (e.g., object distribution, database size, sizes of database schemas, objects created per year). Further, a detailed object view is provided, which includes information representative of each data object discovered within the database(s) (e.g., object name, object type, database location). In the example of FIG. 4D, an example detailed report output by a discovery engine is depicted, which can be downloaded in a file format (e.g., .csv, .xls) for further consumption. The report contains details of the enterprise network (e.g., server name, OS, OS version, DB type, DB version, bottlenecked by CPU or memory, uptime, % utilization, storage disk volumes, mount point, current capacity, occupancy). This data is fed into the other engines to perform the assessment.

As described herein, discovery data provided from the discovery module 204 can be provided to each of the CEA module 206, the CSAS module 208, and the CMP module 210. In some examples, each of the modules transmits a request to the discovery module 204 to request at least a portion of the discovery data. For example, a request can be provided through a respective application programming interface (API). In some examples, the discovery data is provided to requesting modules as a computer-readable file (e.g., .csv filed, .xls file) and/or as API responses. Ingestion of the discovery data to the modules can occur in various ways. In some examples, one or more of the CEA module 206, the CSAS module 208, and the CMP module 210 can include a pre-processor to convert the format of discovery data into another format that enables the respective module to consume the discovery data.

The CEA module 206 includes a cloud readiness and architecture (CRA) sub-module 240, a network assessment sub-module 242, a cloud sovereignty sub-module 244, a data assessment sub-module 246, a mainframe assessment sub-module 248, and a green cloud sub-module 250. In some implementations, the CEA module 206 outputs one or more of a cloud selection recommendation (e.g., recommending cloud platforms to migrate to), a sustainability assessment (e.g., an environmental impact of cloud migration), an application disposition and architectural report (e.g., applications to be migrated and remediations for migration, if any, cloud architecture for applications). In some examples, output of the CEA module 206 can be directly processed by the CSAS module 208 (i.e., the output does not need to be pre-processed for use by the CSAS module 208). In some examples, the output of the CEA module 206 is pre-processed for processing by the CMP module 210. For example, the CMP module 210 can include a pre-processor to convert the format of output of the CEA module 206 into another format that enables the CMP module 210 to consume the output.

In some examples, the CRA sub-module 240 provides and/or coordinates functionality for assessment of applications executed across the enterprise network and determining a target disposition and architecture for each. Example components of the CRA sub-module 240 include, without limitation, a data ingestion component (e.g., to ingest discovery data from the discovery module 204), a rules engine, an assessment component, and an architecture and simulation component. In some examples, a multi-level assessment is provided. For example, a first-level assessment can be used to determine disposition of applications across datacenters of the enterprise through collection of minimum base information. In some examples, the first-level assessment (L1) can provide as output: an application disposition (e.g., rehost, re-platform, retire, re-purchase, re-factor, retain) for each application, potential architecture options, and a migration roadmap. In general, L1 can provide application details (e.g., type, version), architecture type, programming language, OS, system software, DB, interface count, shared service components, data sensitivity, business process/value/criticality, constraints, and the like. As another example, a second-level assessment (L2) can be used to determine target architectures for applications in the cloud, remediation for migration, and inputs for detailed migration planning. In some examples, the second-level assessment can provide as output: application dispositions, target state design, application remediation and efforts, and migration and modernization estimates/plans. In general, L2 can include L1 and also provide detailed application architecture (e.g., technical components, stateful, LB, customization), interface types, security details, operations details, DR/BCP, execution-specific details, license, documentation, and the like.

In further detail, and in some examples, the CRA sub-module 240 leverages and configures one or more third-party tools (e.g., Txture) to drive L1 and L2. For example, a cloud foundation can be captured for calculating a cloud-readiness score for each application, which is representative of relative ease in deploying a respective application to a cloud platform. In some examples, discovery data is automatically processed through cloud readiness assessments (e.g., L1, L2). In some examples, cloud proposals for the potential target architecture are generated by taking into account both characteristics of applications and cloud capabilities across multiple cloud providers. Cloud proposals can be compared for varying advantages/disadvantages across cloud providers.

In some implementations, the network assessment sub-module 242 executes functionality for simulating network performance and application response times in a cloud environment. For example, network assessment sub-module 242 leverages enterprise agents, which can be installed in datacenters of the enterprise network, where the application(s) reside(s), at one end, and cloud agents in the cloud environment. In some examples, tests are executed to determine, among other parameters, network performance characteristics (e.g., latency, packet loss) and application performance (e.g., page load time, response time). Example components of the network assessment sub-module 242 include, without limitation, a cloud agent selection component, an enterprise agent set-up component, a test run component, and a performance reports component.

In some examples, the cloud sovereignty sub-module 244 determines which applications require a sovereign cloud basis for data storage. This enables the user to select the right target solution, provider and location to meet defined objectives. Functionality that can be performed by the cloud sovereignty sub-module 244 is described in further detail in commonly assigned Indian Prov. App. No. 202011002845, filed on Jan. 22, 2020 and entitled "Data Classification and Modelling Based Application Compliance Analysis," as well as Indian Prov. App. No. 202011039680, filed on Sep. 14, 2020 and entitled "Data Classification and Modelling Based Application Compliance Analysis," the disclosures of which are expressly incorporated herein by reference in their entireties for all purposes. Example components of the cloud sovereignty sub-module 244 include, without limitation, a data ingestion component (e.g., to ingest discovery data from the discovery module 204), a knowledge model, and an assessment component.

In some implementations, the data assessment sub-module 246 provides functionality to assess cloud readiness of one or more data warehouses (DWs) of the enterprise network. In some examples, the data assessment sub-module 246 ingest data representative of current DW capabilities and recommends the best suited target architecture and the cloud platform for migration to the cloud. Example components of the data assessment sub-module 246 include, without limitation, a data ingestion component (e.g., to ingest discovery data from the discovery module 204), a rules engine, an assessment component, and an architecture component.

In some implementations, the mainframe assessment sub-module 248 provides functionality to assess cloud readiness of mainframe applications. In some examples, the mainframe assessment sub-module 248 asks for specific inputs pertaining to mainframe, usage, and skills, and determine the target disposition for the application. Example components of the mainframe assessment sub-module 248 include, without limitation, a data ingestion component (e.g., to ingest discovery data from the discovery module 204), a rules engine, an assessment component, and an architecture component.

In some examples, the green cloud sub-module 250 determines a carbon footprint reduction and sustainability index of each potential cloud migration solution. Example components of the green cloud sub-module 250 include, without limitation, a data ingestion component (e.g., to ingest discovery data from the discovery module 204), a knowledge model, a guided recommendation component, and a simulation component. Further discussion of green cloud functionality is described in commonly assigned Indian Prov. App. No. 202011032612, filed on Jul. 30, 2020, and entitled Green Cloud Recommendation System, the disclosure of which is expressly incorporated herein by reference in the entirety for all purposes.

FIGS. 5A-5E depict example screenshots 500, 502, 504, 506, 508, respectively, representing example output provided from the CEA module 206 of the cloud migration platform of the present disclosure. In some examples, the example output includes information representing the enterprise network calculated by one or more sub-modules of the CEA module 206, as described herein.

Figure 5A:
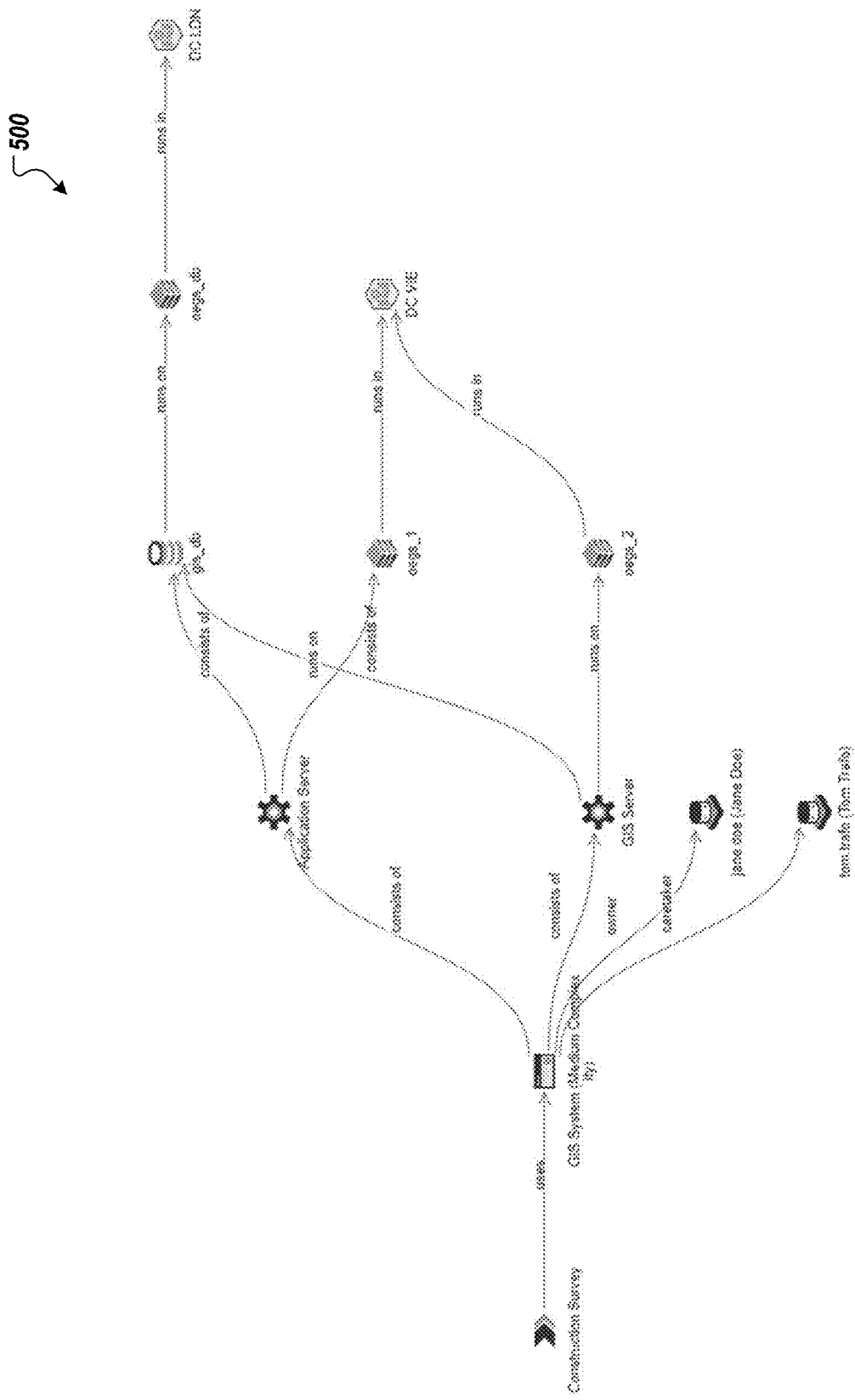
FIGS. 5A-5E depict example screenshots representing example output provided from a cloud enterprise architecture (CEA) engine of the cloud migration platform of the present disclosure.
Figure 5B:
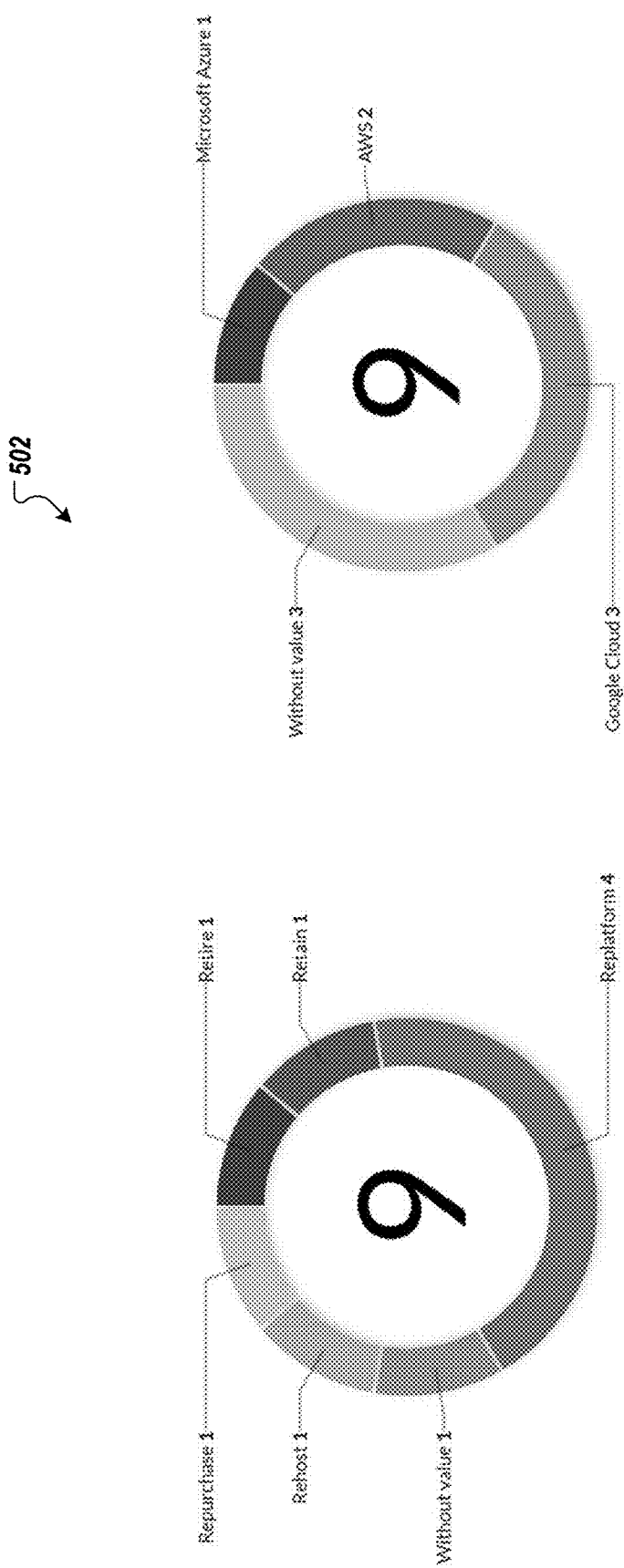
Figure 5C:
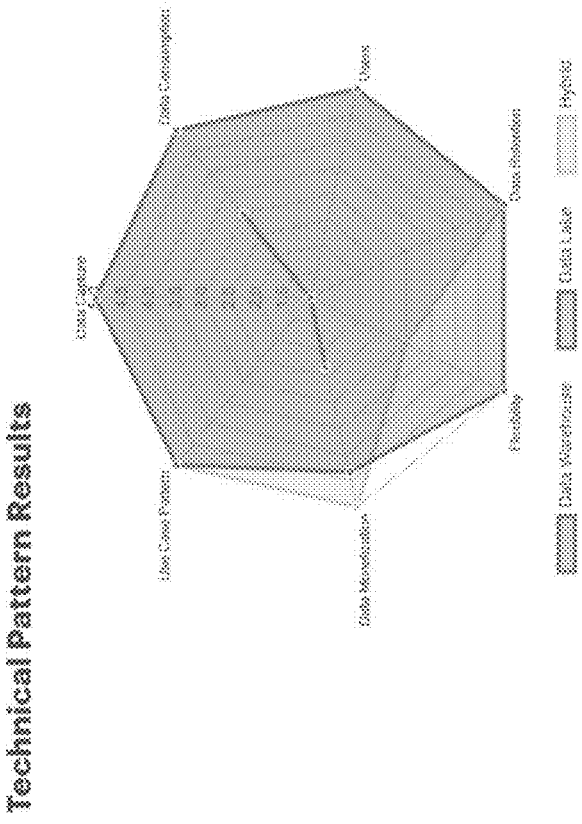
Figure 5D:
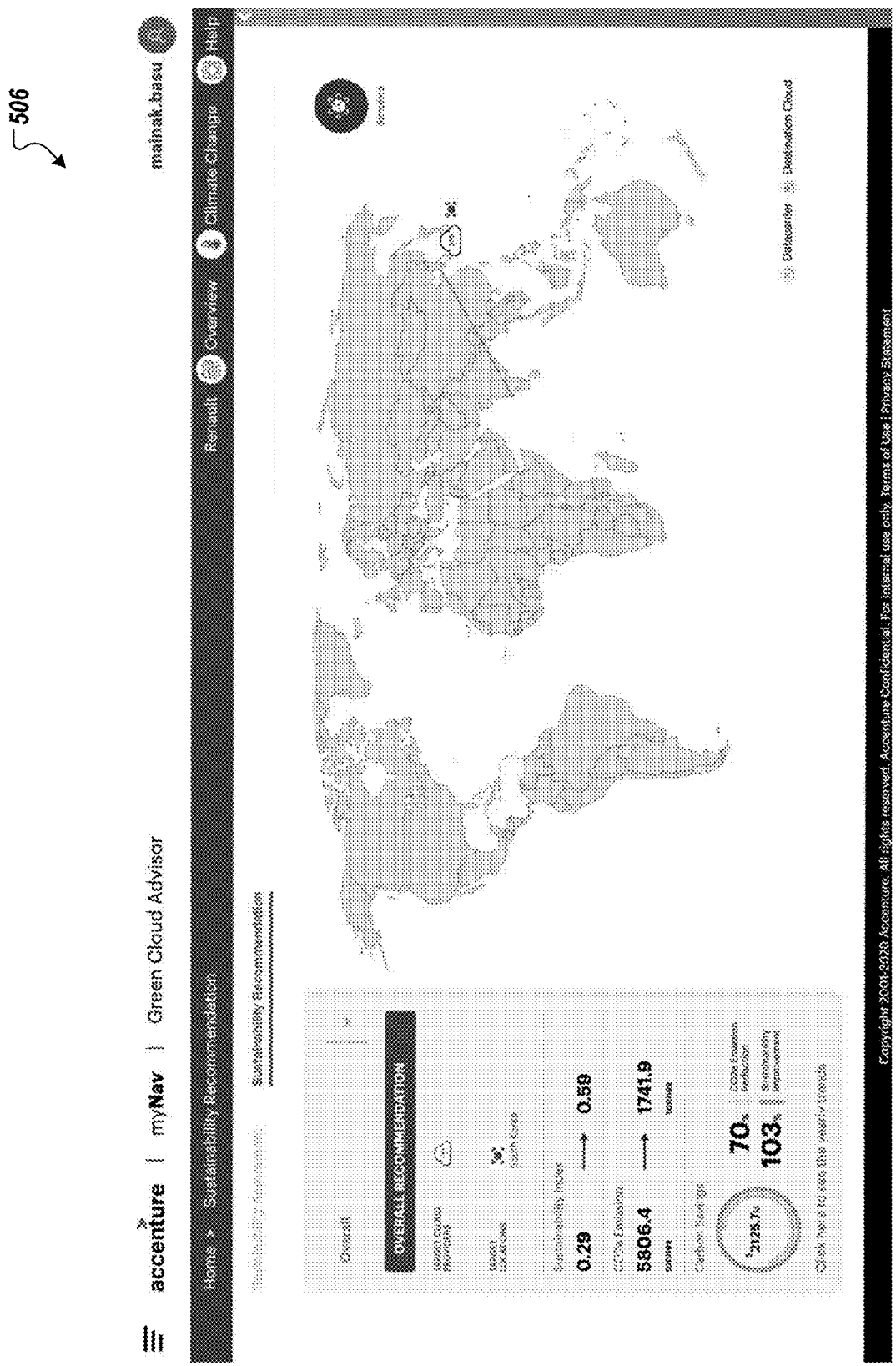
Figure 5E:
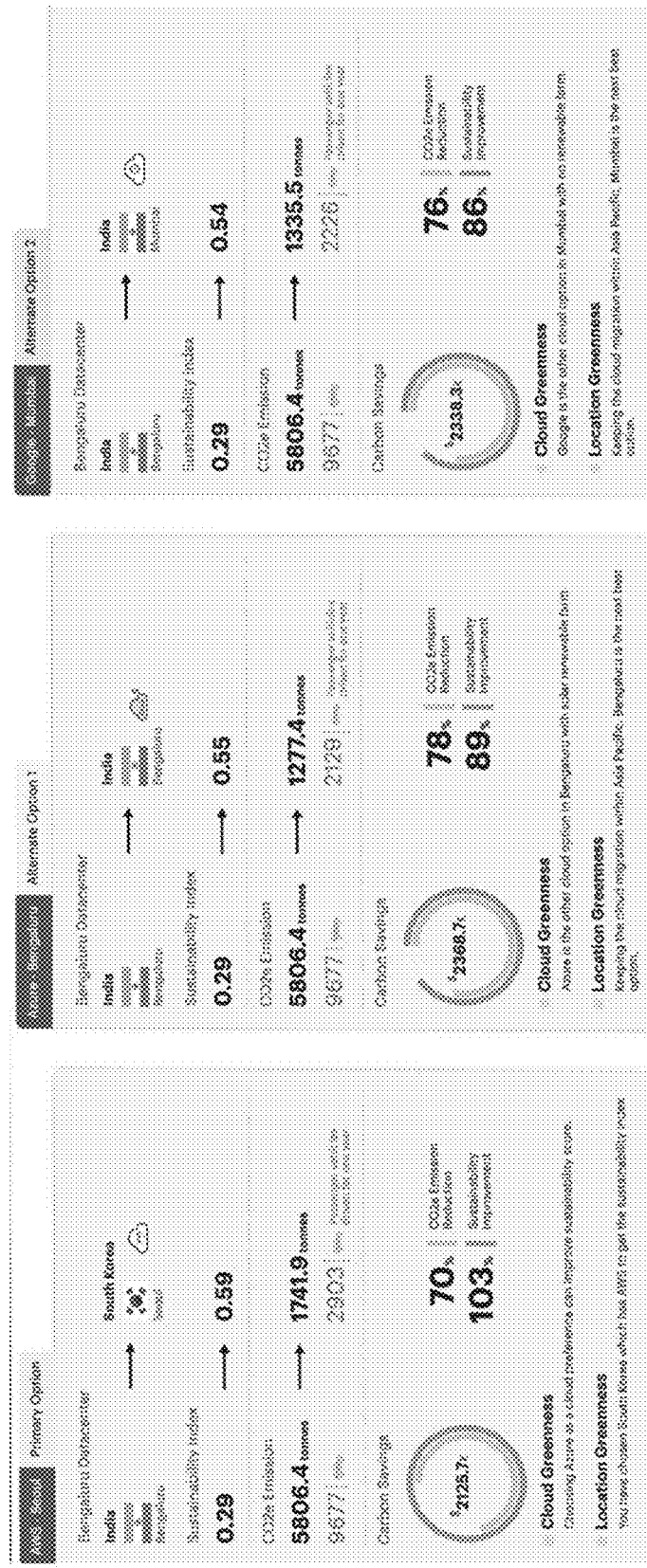

In the example of FIG. 5A, the example screenshot 500 provides a graphical representation of a portion of an example enterprise network, graphically depicting assets included within the enterprise network and relationships between assets. In the example of FIG. 5B, the example screenshot 502 provides graphical representations representative of assets of the example enterprise network respectively summarizing 6R assessment of assets and indicating cloud providers for hosting of assets (e.g., Google Cloud, Amazon Web Services (AWS), Microsoft Azure). In the example of FIG. 5C, the example screenshot 504 depicts an example assessment outcome of the data assessment engine. In the depicted example, scores determined for current data warehouse applications are provided against various technical parameters (e.g., use case patterns, data capture, data retention). The "correct fit" target cloud architecture is in terms of data warehouse, data lake, or a hybrid approach. In the examples of FIGS. 5D and 5E, the example screenshots 506, 508 provide information representative of example output provided by the green cloud sub-module 250 including, for example, a sustainability recommendation based on regional locations of datacenters. As noted above, this is described in further detail in Indian Prov. App. No. 202011032612, filed on Jul. 30, 2020.

The CSAS module 208 includes a vendor-specific architecture and simulation (VAS) sub-module 260, an Infrastructure-as-a-Service (IaaS) sub-module 262, and a cloud application remediation (CAR) sub-module 264. In some implementations, output of the CSAS module 208 includes, without limitation, a target architecture, a set of application remediations, and a BOM. In some implementations, the CSAS module 208 outputs discovery capability, application details on application components and working components (e.g., high availability, DR, backup, maintenance jobs), and assessment information (e.g., outcome of enterprise architecture capability, 6R disposition). In some examples, the output of the CSAS module 208 is pre-processed for processing by the CMP module 210. For example, the CMP module 210 can include a pre-processor to convert the format of output of the CSAS module 208 into another format that enables the CMP module 210 to consume the output.

In some examples, the VAS sub-module 260 ingests user workload historical data and transaction workload data of the enterprise network and analyzes and correlates infrastructure utilization in conjunction with user load and business flow transaction volumes. In some examples, the VAS sub-module 260 generates data specifying the cloud computing resources of a cloud platform (e.g., in the form of a recommended BOM). The VAS sub-module 260 can be used to optimize or improve proposed cloud architectures to support user load and business flows after migration to the cloud. For example, this can include consolidating cloud resources to arrive at efficient resource utilization to absorb spikes in utilization and determining when and where to perform vertical and/or horizontal scaling. Example components of the VAS sub-module 260 can include, without limitation, on the vendor-specific architecture side, a data ingestion component, a knowledge model, a target BOM component, and a visualization component, and, on the vendor-specific simulation side, an application discovery component, a knowledge model, an analytical engine, and an architecture and visualization component.

In some examples, the IaaS sub-module 262 provides functionality to process the discovery output, target cloud resource sizing and additional architectural inputs to plot an application architectural visualization. Example components of the IaaS sub-module 262 include, without limitation, a data ingestion component, a rules engine, and a visualization component.

In some examples, the CAR sub-module 264 provides and/or coordinates high-level application remediation analysis through code scanning. Example components of the CAR sub-module 264 include, without limitation, a data ingestion component, a knowledge model and analytics component, a rules engine, and a visualization component. In some examples, code scanning is executed as part of the discovery, discussed above. For example, the application code scanning sub-module 232 can leverage one or more tools (e.g., CAST Highlight) to provide code scanning data that is processed by the CAR sub-module 264 in the remediation analysis. For example, the code scanning data is processed to assess each application and identify any hinderances to public cloud migration and, for any hinderance, identify one or more remediations and the effort required to implement each.

Figure 6A:
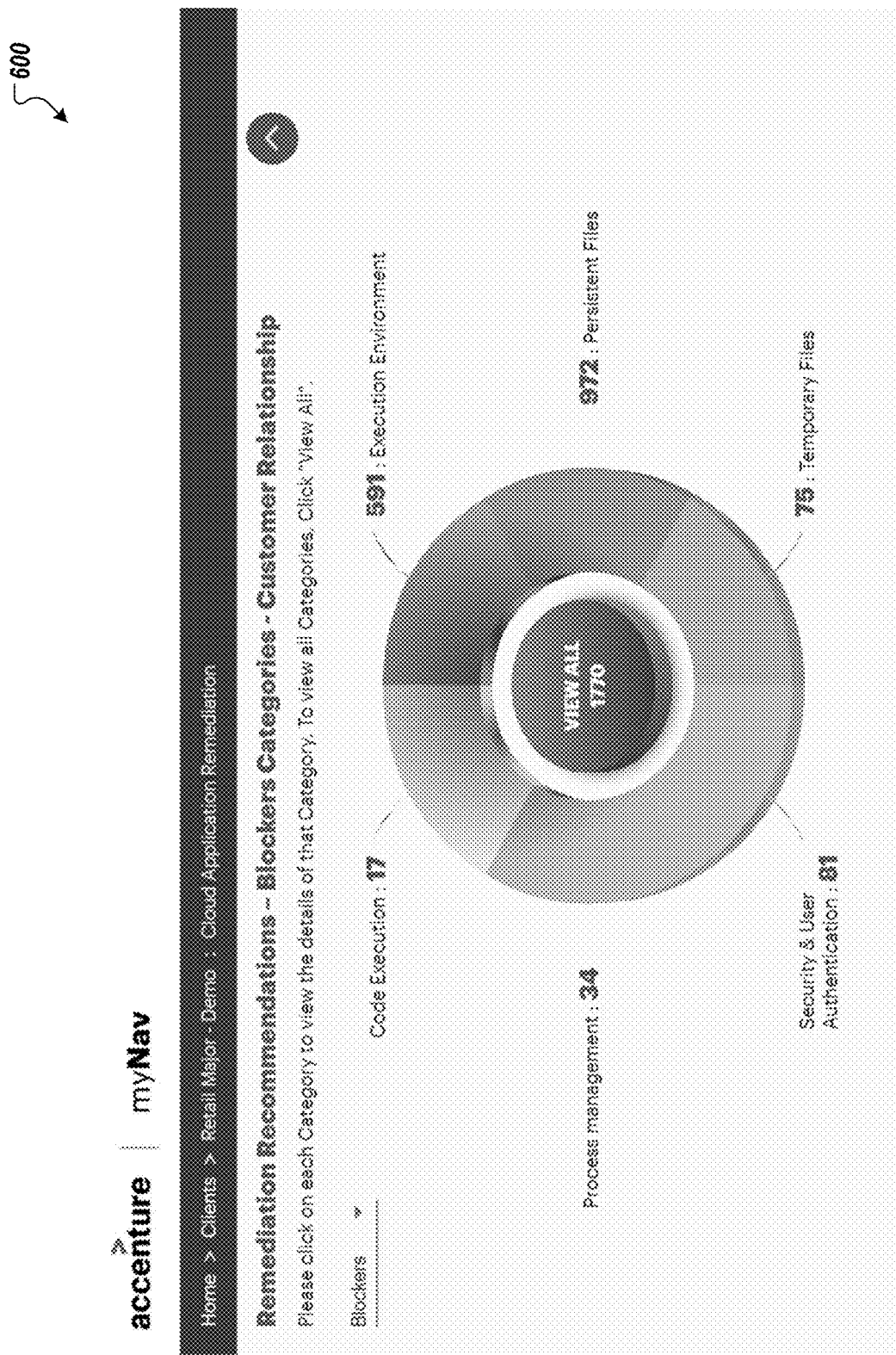
Figure 6C:
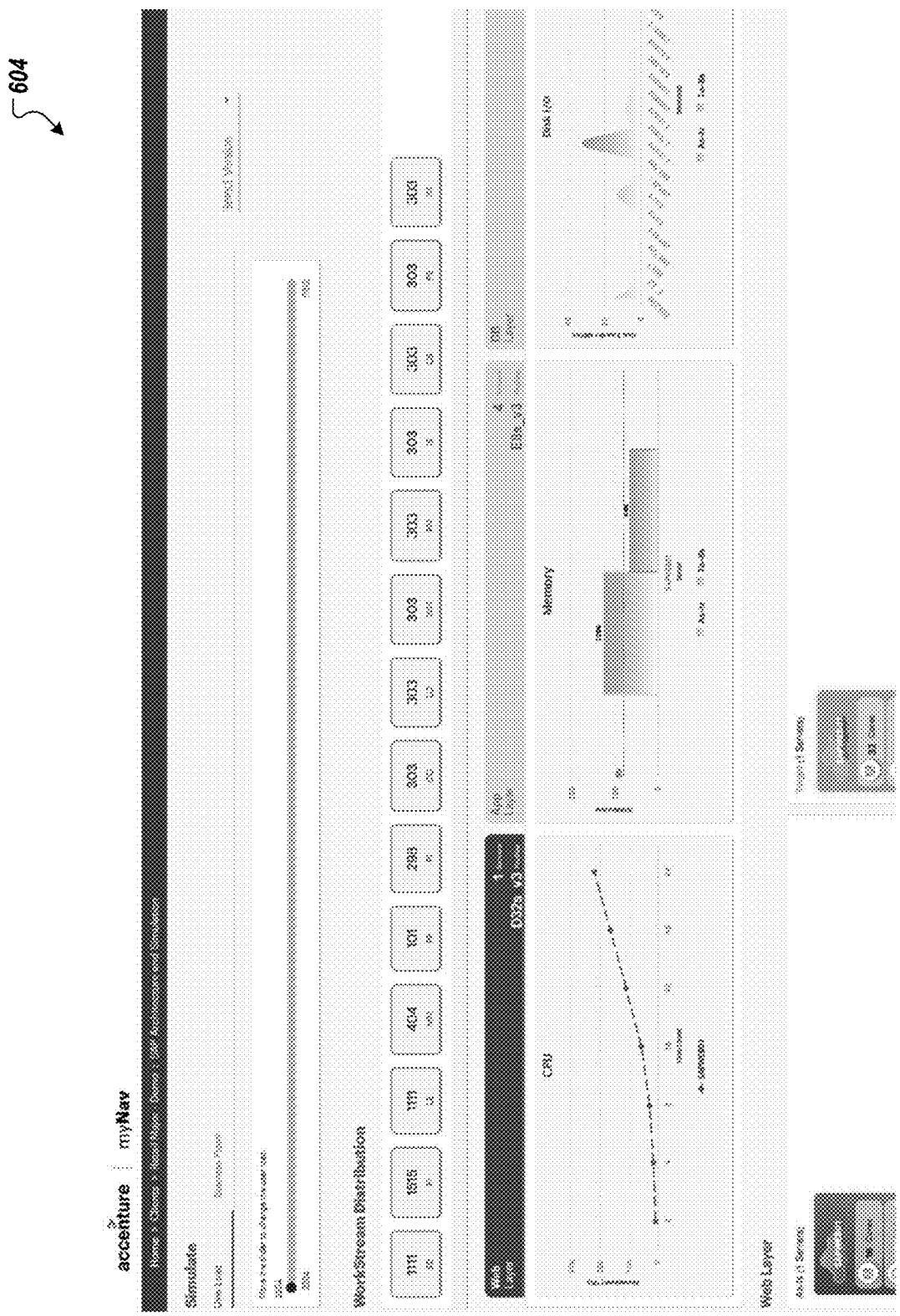

FIGS. 6A-6C depict example screenshots 600, 602, 604, respectively, representing example output provided from the CSAS module 208 of the cloud migration platform of the present disclosure. In the example of FIG. 6A, the example screenshot 600 categories of remediations that can be implemented to migrate applications of the enterprise network to a cloud platform. In the example of FIG. 6B, an example based on the SAP on Cloud Bill of Material that can be downloaded from the vendor-specific module is represented. In this example, all of the cloud resources and their specifications required to build the target system in the cloud are specified. In the example of FIG. 6C, the example screenshot 604 depicts results of workload simulations executed by the VAS sub-module 260. As noted above, this is described in further detail in U.S. application Ser. No. 16/880,591, filed on May 21, 2020.

In the example of FIG. 2, the CMP module 210 includes a high-level migration plan sub-module 270. In some examples, the CMP module 210 generates an application migration sequence and high-level migration plan for executing migration of assets of the enterprise network. The application migration sequence and high-level migration plan are generated through validation of discovery outputs, assessment, and other parameters, as described herein. For example, the high-level migration plan sub-module 270 executes functionality to generate application sequences, group applications, generate a high-level migration plan (and modify each, if needed), and perform validation. Example components of the high-level migration plan sub-module 270 include, without limitation, a data ingestion component, an application stack creator component, a bundle designing and sequencing engine, and a plan generator.

Figure 7A:
Figure 7B:
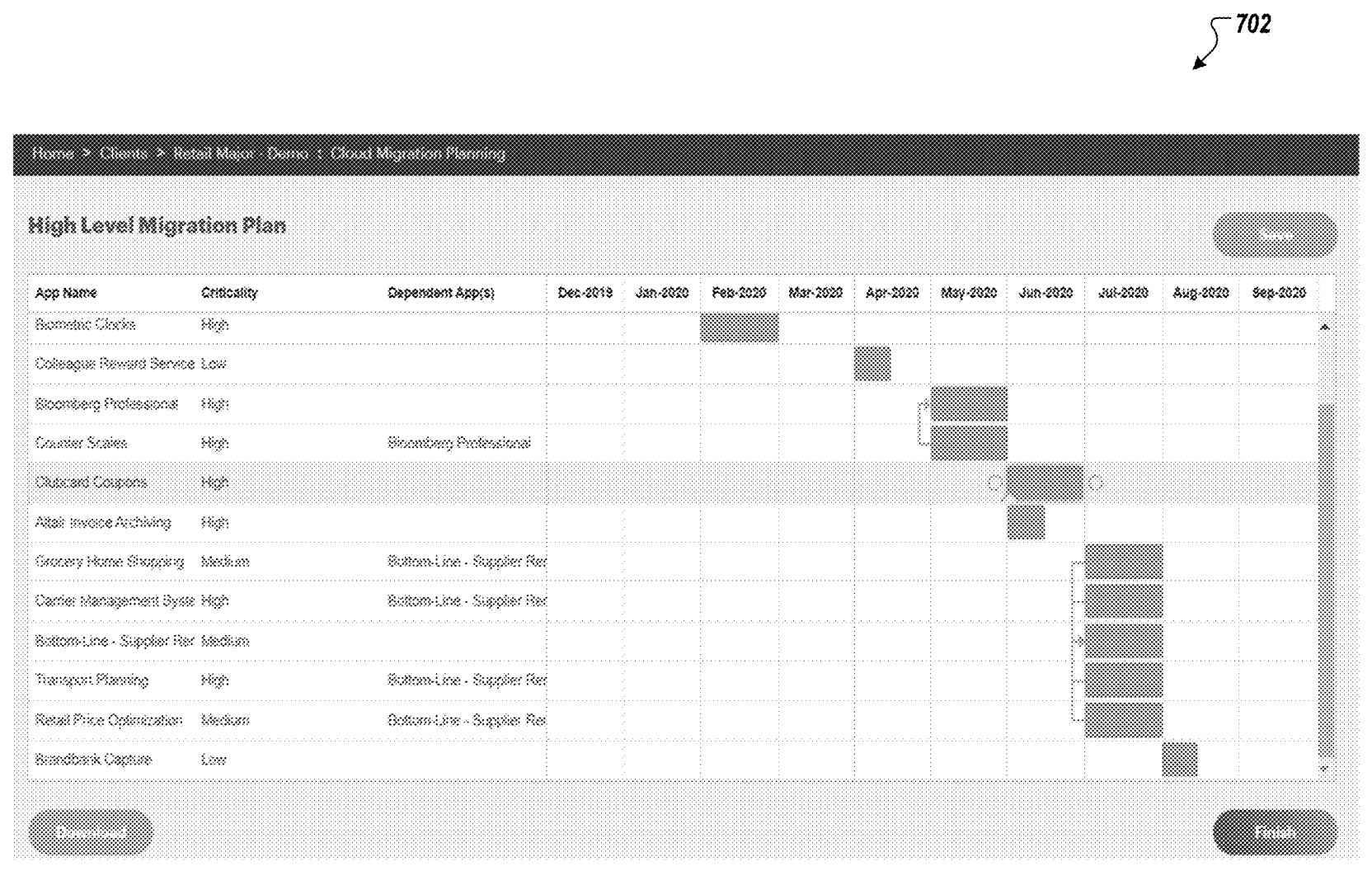

FIGS. 7A and 7B depict example screenshots 700, 702, respectively representing example output provided from the CMP module 210 of the cloud migration platform of the present disclosure. In the example of FIG. 7A, the example screenshot 700 depicts proposed planning and sequencing of applications for cloud deployment including information representative of the applications and proposed cloud deployment (e.g., application name, target location (region of datacenter), environment, and criticality). In the depicted example, the applications are provided in rank order based on configured business factors. In the example of FIG. 7B, the example screenshot 702 depicts a high-level migration plan for multiple applications indicating a proposed time period, over which a respective application is to be migrated. In the depicted example, sequencing of applications for cloud deployment including information representative of the applications are provided (e.g., application name, criticality, dependent applications, proposed time period for migration to cloud platform).

In accordance with implementations of the present disclosure, an enterprise can migrate assets from an existing infrastructure (e.g., on-premise system) to a cloud platform based on the application migration sequence and high-level migration plan provided by the CMP module 210. In some examples, migration can include provisioning hardware (e.g., servers) and software (e.g., OSs, applications) within the cloud platform for the enterprise. For example, and without limitation, one or more instances of a cloud-based application can be instantiated for the enterprise (e.g., a cloud-based application can support multiple tenants, and an instance of the cloud-based application is accessible to the enterprise as a tenant). In some examples, hardware and software are provisioned within respective data centers defined within the migration plan. For example, and without limitation, a first instance of a cloud-based application can be instantiated within a first data center at a first location (e.g., United States (US)) and a second instance of the cloud-based application can be instantiated within a second data center at a second location (e.g., India). In this manner, instances of the cloud-based application can support a geographic expanse of an enterprise (e.g., teams based in the US, teams based in India).

In some examples, migration is executed based on the application sequence plan, which defines an order of migration of multiple applications. For example, the application sequence plan can provide that a first application be migrated before a second application. As another example, the application sequence plan can provide that a first application and a second application be migrated at the same time or within a specified timeframe (e.g., the second application is dependent on the first application). In some examples, the migration plan defines a timeframe for each application, during which the application is to be migrated. Migration of an application can include migrating the application during the timeframe associated with the application in the migration plan.

Figure 8:
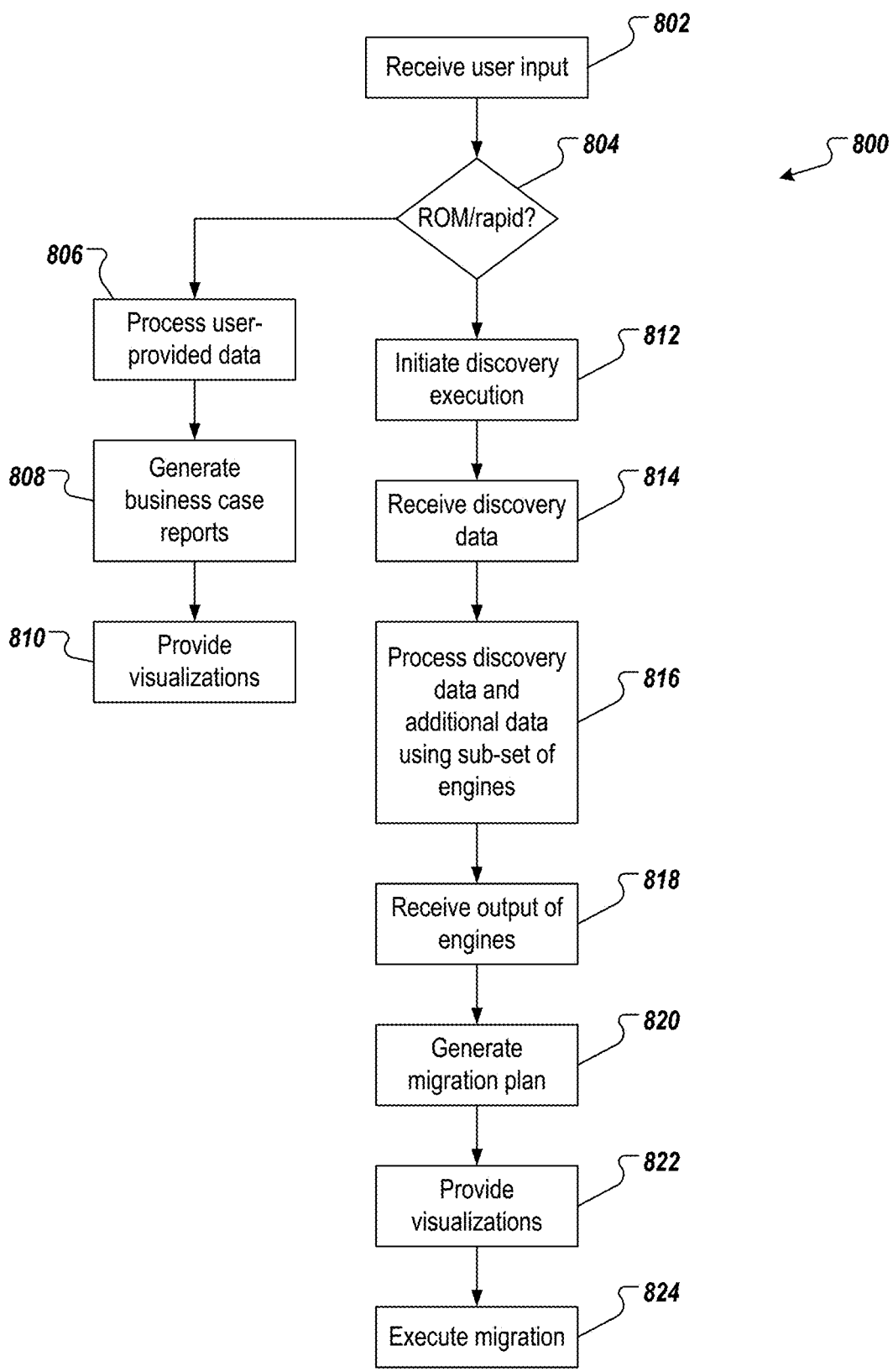
FIG. 8 depicts an example process that can be executed in accordance with implementations of the present disclosure.

FIG. 8 depicts an example process 800 that can be executed in accordance with implementations of the present disclosure. In some implementations, the example process 800 may be performed using one or more computer-executable programs executed using one or more computing devices.

User input is received (802). For example, and as described in further detail herein, a user can interact with the cloud enterprise management module 202 to provide user input to the cloud migration platform 200. In some examples, the user input indicates a type of migration planning that is to be performed by the cloud migration platform 200. For example, a first type of migration planning can include ROM or rapid planning, and a second type of migration planning can include detailed or bespoke planning. A type of migration planning is determined (804). For example, the user input can indicate the type of migration planning that is to be executed.

If the first type of migration planning is indicated, user-provided data is processed (806). For example, and as described in further detail herein, the user can provide user-input representative of assets and parameters of an enterprise network, for which migration planning is to be performed. As described herein, an abstract migration plan based on a user-provided inventory of assets and other information. Example user-provided information can include volumetric data and IT spend. Example volumetric data can include, without limitation, number of applications, number of servers, distribution of servers (e.g., physical vs. virtual distribution), OS distribution (e.g., Windows, Unix, Linux), environment distribution (e.g., production, staging, test, development), application distribution (e.g., database, middleware, others), and server profiles (e.g., CPU, RAM, utilisation for each server). Example IT spend can include, without limitation, cost, depreciation, OpEx, revenue, and estimated cloud consumption. In some examples, the user-provided data is processed through a case computational engine based on cost benchmarks (e.g., by industry, size, region) and hyperscaler resources, regions, and costs to provide the output data. One or more business case reports are generated (808) and one or more visualizations are provided (810). For example, and as described herein, the output data is depicted in one or more executive dashboards and business case reports, such as the examples of FIGS. 3A and 3B.

If the second type of migration planning is indicated, discovery execution is initiated (812). For example, and as described herein, detailed discovery data representative of the enterprise network, for which migration planning is to be performed, is generated by the discovery module 204. Discovery data is received (814). For example, and as described herein, the discovery data generated by the discovery module 204 is received by the CEA module 206 and the CSAS module 208. In some examples, the discovery data (or at least a portion thereof) generated by the discovery module 204 is received by the CMP module 210.

Discovery data and additional data are processed using a sub-set of engines (816). For example, and as described herein, a sub-set of engines of the cloud migration platform 200 can be used for cloud migration planning. As one example, a first sub-set of engines can include all engines available within the cloud migration platform. As another example, a second sub-set of engines can include less than all engines available within the cloud migration platform (e.g., the green cloud sub-module 250 can be foregoing, if a carbon footprint reduction and a sustainability index are not requested by the user).

Output of each engine of the sub-set of engines is received (818). For example, and as described herein, the CMP module 210 receives output of the sub-set of engines. In some examples, an engine can receive output of another engine to generate further output provided to the CMP module 210. For example, and as described herein, an engine (sub-module) of the CEA module 206 can provide output to one or more engines (sub-modules) of the CSAS module 208, the one or more engines generating output that can be provided to the CMP module 210. A migration plan is generated (820) and one or more visualizations are provided (822). For example, and as described in detail herein, the CMP module 210 receives output from each of the CEA module 206 and the CSAS module 208 and generates a migration plan based thereon. Example visualizations are depicted in FIGS. 4A-7B, which are described in detail herein.

At least a portion of the enterprise network is migrated from an existing infrastructure to a cloud platform (824). For example, and as described in further detail herein, at least a portion of the application sequence plan of the cloud migration plan is executed to migrate from the existing infrastructure to the cloud platform. In some examples, executing at least a portion of the application sequence plan includes instantiating an instance of a cloud-based application corresponding to an application executed within an enterprise network, and importing data from the enterprise network to the cloud platform for processing by the cloud-based application. For example, enterprise data previously processed within the existing infrastructure is imported into the cloud infrastructure (e.g., copied from a database of the existing infrastructure to a database of the cloud platform) and the instance of the cloud-based application is enabled to access the data.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions) encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating a migration plan by a cloud migration platform and migrating at least a portion of an enterprise network to one or more cloud platforms, the method being executed by one or more processors and comprising:
   receiving, by the cloud migration platform, user input indicating a type of case for cloud migration planning, the type of case comprising one of an abstract case and a detailed case;
   in response to receiving the type of case, selectively initiating, by the cloud migration platform, a discovery process for generating discovery data representative of infrastructure assets and application assets of the enterprise network;
   processing the discovery data through a sub-set of engines of a set of engines of the cloud migration platform, the sub-set of engines providing output comprising cloud platform selection data, application disposition data, target architecture data, bill of materials (BOM) data, and application remediation data; and
   generating, by a cloud migration planning engine of the cloud migration platform and based on the output, a cloud migration plan comprising an application sequence plan for migrating applications to one or more cloud platforms.

2. The computer-implemented method of claim 1, further comprising migrating at least a portion of the enterprise network from an existing infrastructure to a cloud platform by executing at least a portion of the application sequence plan of the cloud migration plan.

3. The computer-implemented method of claim 2, wherein executing at least a portion of the application sequence plan comprises instantiating an instance of a cloud-based application corresponding to an application executed within an enterprise network, and importing data from the enterprise network to the cloud platform for processing by the cloud-based application.

4. The computer-implemented method of claim 1, wherein generating discovery data representative of infrastructure assets and application assets of the enterprise network comprises providing one or more infrastructure agents and one or more application workload agents within the enterprise network to collect infrastructure data and application workload data from existing assets within the enterprise network, each of the one or more infrastructure agents and one or more application workload agents comprising computer-executable code executed within the enterprise network.

5. The computer-implemented method of claim 1, wherein the discovery data comprises an interim computing architecture representing an existing infrastructure within the enterprise network, the interim computing architecture being generated by an architect generator of a discovery module based on infrastructure data collected from the enterprise network.

6. The computer-implemented method of claim 1, wherein processing the discovery data through a sub-set of engines of the cloud migration platform comprises simulating network performance and application response times using one or more enterprise agents installed in the enterprise network, wherein simulating comprises executing tests to determine network performance characteristics and application performance based on data provided by the one or more enterprise agents from the enterprise network.

7. The computer-implemented method of claim 1, wherein processing the discovery data through a sub-set of engines of the cloud migration platform comprises processing user workload historical data and transaction workload data of the enterprise network to provide the BOM data as specifying cloud computing resources of a cloud platform, processing comprising correlating infrastructure utilization in conjunction with user load and transaction volumes to the cloud computing resources.

8. The computer-implemented method of claim 1, wherein the application remediation data represents one or more remediations to enable migration of an application from an on-premise platform of the enterprise network to a cloud platform, the application remediation data being generated at least partially based on code scanning data that is generated by code scanning of the application.

9. The computer-implemented method of claim 1, wherein the sub-set of engines is selected from the set of engines based on the type of case.

10. A system, comprising:
a computing device; and
a computer-readable storage device coupled to the computing device and having instructions stored thereon which, when executed by the computing device, cause the computing device to perform operations for generating a migration plan by a cloud migration platform and migrating at least a portion of an enterprise network to one or more cloud platforms, the operations comprising:
receiving, by the cloud migration platform, user input indicating a type of case for cloud migration planning, the type of case comprising one of an abstract case and a detailed case;
in response to receiving the type of case, selectively initiating, by the cloud migration platform, a discovery process for generating discovery data representative of infrastructure assets and application assets of the enterprise network;
processing the discovery data through a sub-set of engines of a set of engines of the cloud migration platform, the sub-set of engines providing output comprising cloud platform selection data, application disposition data, target architecture data, bill of materials (BOM) data, and application remediation data; and
generating, by a cloud migration planning engine of the cloud migration platform and based on the output, a cloud migration plan comprising an application sequence plan for migrating applications to one or more cloud platforms.

11. The system of claim 10, wherein operations further comprise migrating at least a portion of the enterprise network from an existing infrastructure to a cloud platform by executing at least a portion of the application sequence plan of the cloud migration plan.

12. A non-transitory computer-readable storage medium coupled to one or more processors and having instructions stored thereon which, when executed by the one or more processors, cause the one or more processors to perform operations for generating a migration plan by a cloud migration platform and migrating at least a portion of an enterprise network to one or more cloud platforms, the operations comprising:
receiving, by the cloud migration platform, user input indicating a type of case for cloud migration planning, the type of case comprising one of an abstract case and a detailed case;
in response to receiving the type of case, selectively initiating, by the cloud migration platform, a discovery process for generating discovery data representative of infrastructure assets and application assets of the enterprise network;
processing the discovery data through a sub-set of engines of a set of engines of the cloud migration platform, the sub-set of engines providing output comprising cloud platform selection data, application disposition data, target architecture data, bill of materials (BOM) data, and application remediation data; and
generating, by a cloud migration planning engine of the cloud migration platform and based on the output, a cloud migration plan comprising an application sequence plan for migrating applications to one or more cloud platforms.

13. The non-transitory computer-readable storage medium of claim 12, wherein operations further comprise migrating at least a portion of the enterprise network from an existing infrastructure to a cloud platform by executing at least a portion of the application sequence plan of the cloud migration plan.

14. The non-transitory computer-readable storage medium of claim 13, wherein executing at least a portion of the application sequence plan comprises instantiating an instance of a cloud-based application corresponding to an application executed within an enterprise network, and importing data from the enterprise network to the cloud platform for processing by the cloud-based application.

15. The non-transitory computer-readable storage medium of claim 12, wherein generating discovery data representative of infrastructure assets and application assets of the enterprise network comprises providing one or more infrastructure agents and one or more application workload agents within the enterprise network to collect infrastructure data and application workload data from existing assets within the enterprise network, each of the one or more infrastructure agents and one or more application workload agents comprising computer-executable code executed within the enterprise network.

16. The non-transitory computer-readable storage medium of claim 12, wherein the discovery data comprises an interim computing architecture representing an existing infrastructure within the enterprise network, the interim computing architecture being generated by an architect generator of a discovery module based on infrastructure data collected from the enterprise network.

17. The non-transitory computer-readable storage medium of claim 12, wherein processing the discovery data through a sub-set of engines of the cloud migration platform comprises simulating network performance and application response times using one or more enterprise agents installed in the enterprise network, wherein simulating comprises executing tests to determine network performance characteristics and application performance based on data provided by the one or more enterprise agents from the enterprise network.

18. The non-transitory computer-readable storage medium of claim 12, wherein processing the discovery data through a sub-set of engines of the cloud migration platform comprises processing user workload historical data and transaction workload data of the enterprise network to provide the BOM data as specifying cloud computing resources of a cloud platform, processing comprising correlating infrastructure utilization in conjunction with user load and transaction volumes to the cloud computing resources.

19. The non-transitory computer-readable storage medium of claim 12, wherein the application remediation data represents one or more remediations to enable migration of an application from an on-premise platform of the enterprise network to a cloud platform, the application remediation data being generated at least partially based on code scanning data that is generated by code scanning of the application.

20. The non-transitory computer-readable storage medium of claim 12, wherein the sub-set of engines is selected from the set of engines based on the type of case.

\* \* \* \* \*